US010547497B1

(12) United States Patent
Mostafa et al.

(10) Patent No.: US 10,547,497 B1
(45) Date of Patent: Jan. 28, 2020

(54) METHODS AND SYSTEMS FOR PROVIDING PREDICTIVE RATING USING A BUFFER

(71) Applicant: NetCracker Technology Corp., Waltham, MA (US)

(72) Inventors: Habib I Mostafa, Oviedo, FL (US); Tom Shusta, Lake Mary, FL (US); Sreedhar Rao, Lewis Center, OH (US); Jason Jump, Covington, KY (US); Michael Magnotta, Cincinnati, OH (US); Debdatta Bhattacharjee, Hyderabad (IN)

(73) Assignee: NETCRACKER TECHNOLOGY CORP., Waltham, MA (US)

( * ) Notice: Subject to any disclaimer, the term of this patent is extended or adjusted under 35 U.S.C. 154(b) by 204 days.

(21) Appl. No.: 15/395,295

(22) Filed: Dec. 30, 2016

Related U.S. Application Data

(60) Provisional application No. 62/273,741, filed on Dec. 31, 2015.

(51) Int. Cl.
*H04L 12/24* (2006.01)
*H04W 4/14* (2009.01)
(Continued)

(52) U.S. Cl.
CPC ...... *H04L 41/0622* (2013.01); *H04L 12/1403* (2013.01); *H04L 12/1457* (2013.01);
(Continued)

(58) Field of Classification Search
CPC ...... H04W 4/24; H04L 12/14; H04L 12/1403; H04L 12/1407; H04L 12/1442; H04L 12/1453; H04L 12/1457
See application file for complete search history.

(56) References Cited

U.S. PATENT DOCUMENTS 6,804,337 B1   10/2004 Anderson et al.
7,450,928 B1 * 11/2008 Henry, Jr. .......... G06Q 30/0239
                                                      379/114.15
(Continued)

FOREIGN PATENT DOCUMENTS

EP         2953333 A1 * 12/2015 ............. H04L 12/14
WO   WO-0158199 A1 *  8/2001 ............. G06Q 20/28
(Continued)

OTHER PUBLICATIONS

Non-Final Office Action dated Jan. 26, 2017 in co-pending U.S. Appl. No. 14/645,582 (15 pgs.).
(Continued)

*Primary Examiner* — Patrice L Winder
(74) *Attorney, Agent, or Firm* — Foley & Lardner LLP

(57) ABSTRACT

The present solution relates to an improved system and method for reducing traffic flow between the customer's client device, network, and the charging system. The methods and systems described herein can provide a predictive rating buffer between the network and the charging system. The predictive rating buffer can receive, from the online charging solution, data about services to be provided to a client device. The predictive rating buffer can generate primary allocation balances for the client device. Network grants can be made to the client device by the primary allocation balances. If a primary allocation balance is exhausted, an incoming grant can be granted from a contingency allocation balance.

20 Claims, 13 Drawing Sheets

(51) Int. Cl.
*H04L 12/26* (2006.01)
*H04L 12/14* (2006.01)
*H04W 4/24* (2018.01)

(52) U.S. Cl.
CPC .............. *H04L 43/065* (2013.01); *H04W 4/14* (2013.01); *H04W 4/24* (2013.01)

(56) References Cited

U.S. PATENT DOCUMENTS

| | | | | |
|---|---|---|---|---|
| 8,630,613 | B2* | 1/2014 | Lisi | H04W 4/24 455/406 |
| 8,660,521 | B1* | 2/2014 | Daniel | H04W 4/50 455/405 |
| 8,799,092 | B2* | 8/2014 | Valdes | G06Q 20/10 705/26.35 |
| 9,225,847 | B2* | 12/2015 | Daymond | G06Q 30/0255 |
| 2002/0010666 | A1 | 1/2002 | Wright | |
| 2004/0193512 | A1 | 9/2004 | Gobin et al. | |
| 2005/0021458 | A1* | 1/2005 | Rowe | G06Q 20/10 705/39 |
| 2008/0319926 | A1 | 12/2008 | Alam et al. | |
| 2009/0055299 | A1 | 2/2009 | King | |
| 2009/0081989 | A1* | 3/2009 | Wuhrer | G06Q 20/10 455/406 |
| 2010/0075630 | A1* | 3/2010 | Tillitt | H04W 4/24 455/406 |
| 2010/0121660 | A1 | 5/2010 | Boykin | |
| 2011/0010461 | A1 | 1/2011 | Lassila et al. | |
| 2012/0246042 | A1 | 9/2012 | Littrell | |
| 2013/0124376 | A1 | 5/2013 | Lefebvre et al. | |
| 2013/0159385 | A1 | 6/2013 | Ocher et al. | |
| 2014/0038545 | A1* | 2/2014 | Ramprasad | H04W 4/24 455/405 |
| 2014/0040975 | A1 | 2/2014 | Raleigh et al. | |
| 2014/0279438 | A1* | 9/2014 | Reiff | G06Q 20/28 705/39 |
| 2014/0372269 | A1 | 12/2014 | Ternan et al. | |

FOREIGN PATENT DOCUMENTS

| | | | | |
|---|---|---|---|---|
| WO | WO-2007120117 | A2 * | 10/2007 | ............ H04M 15/00 |
| WO | WO-2013168093 | A2 * | 11/2013 | ............ G06Q 20/22 |

OTHER PUBLICATIONS

Final Office Action dated Sep. 11, 2017 in related U.S. Appl. No. 14/645,582 (16 pages.).
Peltier Tech Blog, "Variable Width Column Charts", 2013, https://peltiertech.com/variable-width-column-charts/#comment-306352.
Walking Tree, "Create Interactive charts and implement drill-down—using Sencha Touch Pie chart and Bar Chart", 2013, https://wtcindia.wordpress.com/2013/05/20-create-interactive-charts-and-implement-drill-down-using-sencha-touch-pie-chart-and-bar-chart/.
Final Office Action dated Jan. 24, 2019 in related U.S. Appl. No. 14/645,582 (18 pgs.).
Non-Final Office Action dated Nov. 16, 2018 in co-pending U.S. Appl. No. 15/395,320 (14 pgs.).
Final Office Action dated Jun. 13, 2019 in related U.S. Appl. No. 15/395,320 (14 pgs.).

* cited by examiner

METHODS AND SYSTEMS FOR PROVIDING PREDICTIVE RATING USING A BUFFER

CROSS-REFERENCE TO RELATED APPLICATIONS

This application claims the benefit of U.S. Provisional Application No. 62/273,741, filed Dec. 31, 2015, the contents of which are incorporated by reference herein in their entirety.

FIELD OF THE INVENTION

The present disclosure relates to systems and methods for reducing traffic between a network and an online charging solution. In particular, the present disclosure relates to methods and systems for providing a mediator between a network and an online charging solution.

BACKGROUND OF THE INVENTION

Telecommunication service providers want an accurate representation of a customer's balance and data consumption in real time. Without up to date balance information, a user may consume more data than the customer's plan provides, which can result in unintended overages for the customer. However, frequent reporting of the customer's device to the service providers charging system can result in high network traffic and high computational costs, too.

BRIEF SUMMARY OF THE INVENTION

The present solution disclosed herein is directed to methods and systems for reducing traffic between a network and an online charging solution. According to one aspect of the disclosure, a method for reducing data traffic flow between a network and an online charging solution can include receiving, by a predictive rating buffer, from an online charging solution, for a client device, data corresponding to at least one service to provide to the client device. The method can also include generating, by the predictive rating buffer, for a first service of the at least one service to which the client device is subscribed, a primary allocation balance and a contingency allocation balance. The primary allocation balance for the first service can have an expiration time. The contingency allocation balance can be used responsive to the depletion of the primary allocation balance for the first service. The method can also include receiving, by the predictive rating buffer, a first request to allocate a first grant from the primary allocation balance for the first service to be used by the client device. The method can include granting, by the predictive rating buffer, from the primary allocation balance for the first service. The first grant is granted responsive to the first request. The method can also include identifying, by the predictive rating buffer, usage by the client device from the first grant of the first service. The primary allocation balance is updated responsive to the identified usage. The method can also include determining, by the predictive rating buffer, that the primary allocation balance for the first service is depleted. The method can include receiving, by the predictive rating buffer, a second request to allocate a second grant from the primary allocation balance for the first service to be used by the client device. The second grant can be granted from the contingency allocation balance responsive to determining that the primary allocation balance for the first service has been depleted.

The method can also include identifying, by the predictive rating buffer, additional usage by the client device from the second grant for the first service, and updating the contingency allocation balance responsive to the identified additional usage by the client device. The method can also include generating, responsive to an exhaustion of the primary allocation balance, a second primary allocation balance for the first service to which the client device is subscribed. In other implementations, the second primary allocation balance is generated prior to the exhaustion of the first primary allocation balance.

The method can also include receiving, by the predictive rating buffer, a third request to allocate a third grant from the second primary allocation of the first service to be used by the client device and then granting the request. When additional usage is identified the second primary allocation balance is updated.

The method can also include generating, by the prediction rating buffer, a primary usage balance for a second service of the at least one services to which the client device is subscribed. The method can also include receiving, by the predictive rating buffer, a third request to allocate a third grant from the primary allocation balance for the second service to be used by the client device. The first service can include one of a data service, a short message service (SMS), and a voice service. In some implementations, the granting from the contingency allocation balance to the second grant is responsive to an exchange rate.

The method can also include generating, by the predictive rating buffer, one or more charge reports responsive to the identified usage by the client device. An aggregated charge report can be generated from the one or more charge reports responsive to a charge reporting policy. The aggregated charge report can be transmitted to the OCS.

According, to another aspect of the disclosure, a system for reducing data traffic flow between a network and an online charging solution can include a predictive rating buffer. The predictive rating buffer can include one or more processors. The predictive rating buffer is configured to receive from an online charging solution, for a client device, data corresponding to at least one service to provide to the client device. The predictive rating buffer is also configured to generate, for a first service of the at least one service to which the client device is subscribed, a primary allocation balance and a contingency allocation balance. The primary allocation balance for the first service has an expiration time. The contingency allocation balance can be used responsive to a depletion of the primary allocation balance for the first service. The predictive rating buffer is also configured to receive a first request to allocate a first grant from the primary allocation balance for the first service to be used by the client device. The predictive rating buffer is also configured to grant from the primary allocation balance for the first service. The predictive rating buffer is also configured to identify usage by the client device from the first grant for the first service and update the primary allocation balance for the first service. The predictive rating buffer is also configured to determine that the primary allocation balance for the first service has been depleted. The predictive rating buffer is also configured to receive a second request to allocate a second grant from the primary allocation balance for the first service to be used by the client device. The predictive rating buffer is also configured to grant from the contingency allocation balance the second grant when the first primary allocation balance is depleted.

The predictive rating buffer can also be configured to identify additional usage by the client device from the second grant for the first service and update the contingency allocation balance. The predictive rating buffer can also be configured to generate, responsive to an exhaustion of the primary allocation balance, a second primary allocation balance for the first service to which the client device is subscribed. The predictive rating buffer can also be configured to generate, prior to an exhaustion of the primary allocation balance, a second primary allocation balance for the first service to which the client device is subscribed. The predictive rating buffer can also be configured to receive a third request to allocate a third grant from the second primary allocation of the first service to be used by the client device and grant from the second primary allocation balance, the third grant responsive to the third request. The predictive rating buffer can also be configured to identify additional usage by the client device from the third grant and update the second primary allocation for the first service responsive to the identified additional usage by the client device.

The predictive rating buffer can also be configured to generate a primary usage balance for a second service of the at least one services to which the client device is subscribed. The predictive rating buffer can also be configured to receive a third request to allocate a third grant from the primary allocation balance for the second service to be used by the client device. The predictive rating buffer can also be configured to grant, from the contingency allocation balance, the second grant responsive to an exchange rate. The predictive rating buffer can also be configured to generate one or more charge reports responsive to the identified usage by the client device, and transmit an aggregated charge report to the OCS. The aggregated charge report is generated from the one or more charge reports responsive to a charge reporting policy.

The present solution disclosed herein is directed to methods and systems for reducing traffic flow between a network and an online charging solution. The methods and systems implement an intelligent quota cache or buffer cache via a mediator that is configured between devices and an online charging solution. According to one aspect, a method for reducing data traffic flow between a network and an online charging solution includes allocating, by an online charging solution including one or more processors, for a service provided to a device, a quota of the service to a mediator intermediary to the device and the online charging solution, the quota of services allocated according to a quota allocation policy established by the online charging solution. The quota allocation policy identifies a validity time of the allocation of the quota of the service. The method also includes providing, by the mediator, a plurality of resource grants to the device. Each resource grant of the plurality of resource grants has a size limit and a time period. The period of time can be defined by a start time and an expiration time. The method further includes receiving, by the mediator, a plurality of resource usage reports corresponding to the plurality of resource grants. Each resource usage report corresponds to a resource grant of the plurality of resource grants and includes data identifying an amount of resources used by the device during the time period of the resource grant. The method also includes determining an aggregate amount of resources based on a sum of the amounts of resources used by the device identified in each of the plurality of resource usage reports. The method can also include generating, by the mediator, a charge report identifying the aggregate amount of resources, and providing, by the mediator to the online charging solution, the charge report responsive to the device consuming the quota of services or an expiration of the validity time.

In some implementations, the method can also include, responsive to a network grant request for a device, identifying, by the online charging solution, the device based on the network grant request, and identifying, for the identified device, a subscriber record of the device. The method can also include identifying the quota allocation policy corresponding to the subscriber record.

In some implementations, providing, by the mediator, the plurality of resource grants to the device includes providing a first resource grant and a second resource grant. The first resource grant has a first expiration time and the second resource grant grants at the expiration of the first expiration time. The first resource grant can include a first size limit and the second resource grant can include a second size limit.

In some implementations, the method also includes generating, by the mediator, a plurality of consumption reports according to a consumption reporting policy established by the online charging solution. The consumption reporting policy can identify a reporting time and a consumption size. The method can also include providing, by the mediator to the online charging solution, the generated consumption reports. Each of the generated consumption reports provided to the online charging solution can be based on the consumption reporting policy.

The method can also include determining that a time since a first generated consumption report of the plurality of consumption reports was last provided to the online charging solution is equal to or exceeds the reporting time or that an amount of resources used by the device since the generated consumption report was last reported is equal to or exceeds the consumption size. The method can also include providing a second generated consumption report of the plurality of consumption reports responsive to the determination.

In some implementations, the method includes generating, by the mediator, a record responsive to receiving the allocation of the quota of services for the device. The quota allocation policy can identify a consumption reporting policy that indicates a reporting time and a consumption size and a network grant policy that indicates a grant time and a grant size. The consumption reporting policy can including one or more rules for providing consumption reports to the online charging solution, and the network grant policy can include one or more rules for providing the device a grant for resources.

In some implementations, the method includes maintaining, by the mediator, a plurality of cache records. The plurality of cache records can include a first cache record corresponding to the device and generated responsive to allocating the quota to the mediator.

According to another aspect of the disclosure, a system for reducing data traffic flow between a network and an online charging solution includes an online charging solution and a mediator. The online charging solution includes one or more processors. The online charging solution is configured to allocate, for a device of the plurality of devices, a quota of services to the mediator. The quota of services is allocated according to a quota allocation policy established by the online charging solution. The quota allocation policy identifies a validity time. The mediator of the system is configured to provide a plurality of resource grants to the device. Each resource grant of the plurality of resource grants has a size limit and a time period that is defined by a start and an expiration time. The mediator is also configured to receive a plurality of resource usage reports corresponding to the plurality of resource grants. Each resource usage report corresponds to a resource grant of the plurality of resource grants and includes data identifying an amount of resources used by the device during the time period of the resource grant. The mediator is also configured to determine an aggregate amount of resources based on a sum of the amounts of resources used by the device identified in each of the plurality of resource usage reports. The mediator can also generate a charge report identifying the aggregate amount of resources, and provide, to the online charging solution, the charge report responsive to the device consuming the quota of services or an expiration of the validity time.

In some implementations, the online charging solution is also configured to identify the device based on the network grant request responsive to a network grant request for a device. The mediator can identify, for the identified device, a subscriber record of the device, and identify the quota allocation policy corresponding to the subscriber record.

In some implementations, the mediator is configured to provide the plurality of resource grants to the subscriber by providing a first resource grant that has a first expiration time and then providing a second resource grant at the expiration of the first resource grant. The first resource grant can include a first size limit and the second resource grant can include a second size limit.

The mediator can also be configured to generate a plurality of usage reports according to a usage reporting policy established by the online charging solution. The usage reporting policy can identify a reporting time and a usage size. The mediator can also be configured to provide, to the online charging solution, the generated usage reports.

In some implementations, the mediator is configured to determine that a time since a first generated usage report of the plurality of usage reports was last provided to the online charging solution is equal to or exceeds the reporting time or that an amount of resources used by the device since the generated usage report was last reported is equal to or exceeds the usage size, and provide the generated usage reports to the online charging solution. The mediator can generate a record responsive to receiving the allocation of the quota of services for the device.

In some implementations, the quota allocation policy can identify a usage reporting policy that indicates a reporting time and a usage size and a network grant policy that indicates a grant time and a grant size. The usage reporting policy can include one or more rules for providing usage reports to the online charging solution. The network grant policy can include one or more rules for providing the device a grant for resources.

In some implementations, the mediator is also configured to maintain a plurality of cache records. The plurality of cache records include a first cache record corresponding to the device and generated responsive to allocating the quota to the mediator.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
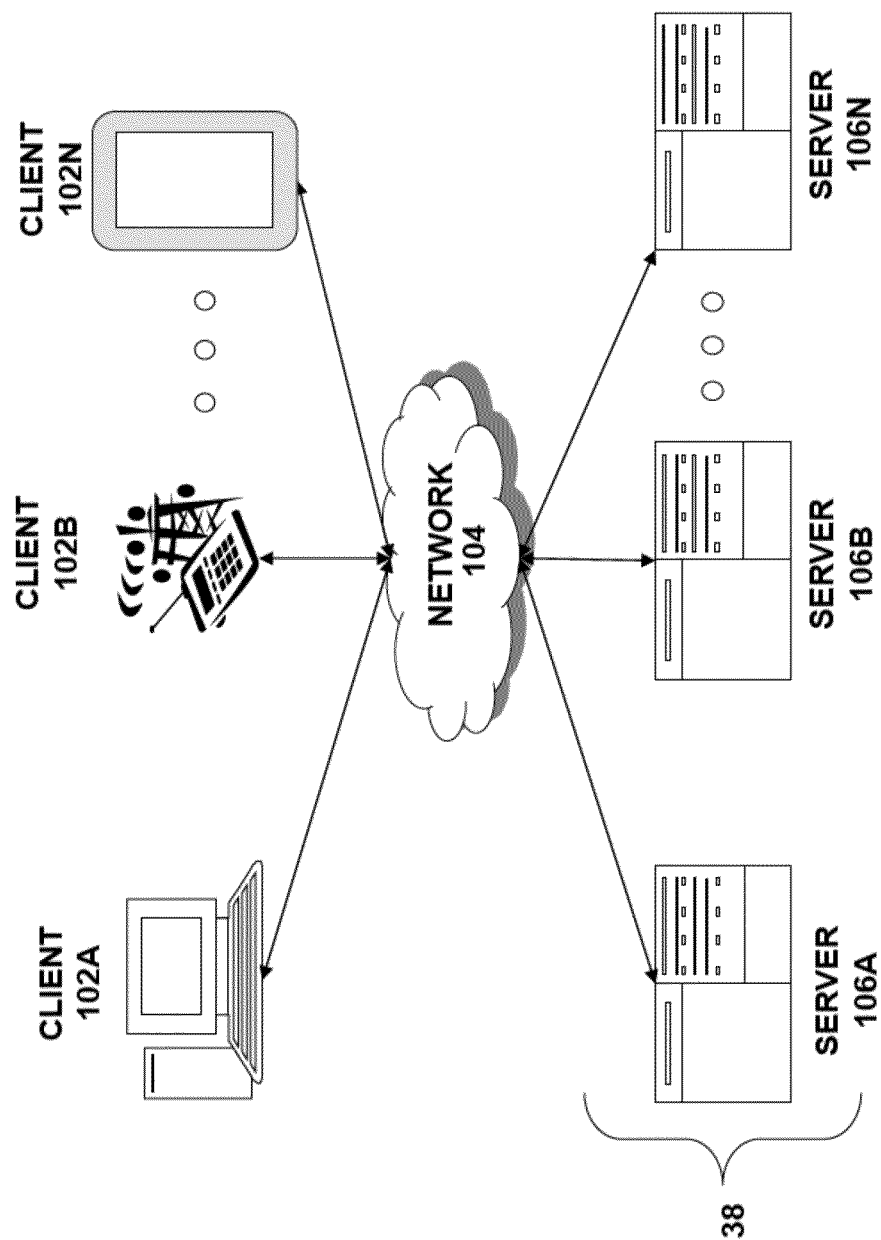
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following enumeration of the sections of the specification and their respective contents may be helpful:

Section A describes a network and computing environment which may be useful for practicing embodiments described herein; and Section B describes embodiments of a system and method for reducing traffic between a network and an online charging solution.

Section C describes embodiments of a system and method for providing predictive rating using a buffer.

A. Network and Computing Environment

Prior to discussing the specifics of embodiments of the systems and methods, it may be helpful to discuss the network and computing environments in which such embodiments may be deployed, including a description of components and features suitable for use in the present systems and methods. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS 7 or 8, manufactured by Microsoft Corp. of Redmond, Wash., UNIX, LINUX, or OS X.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
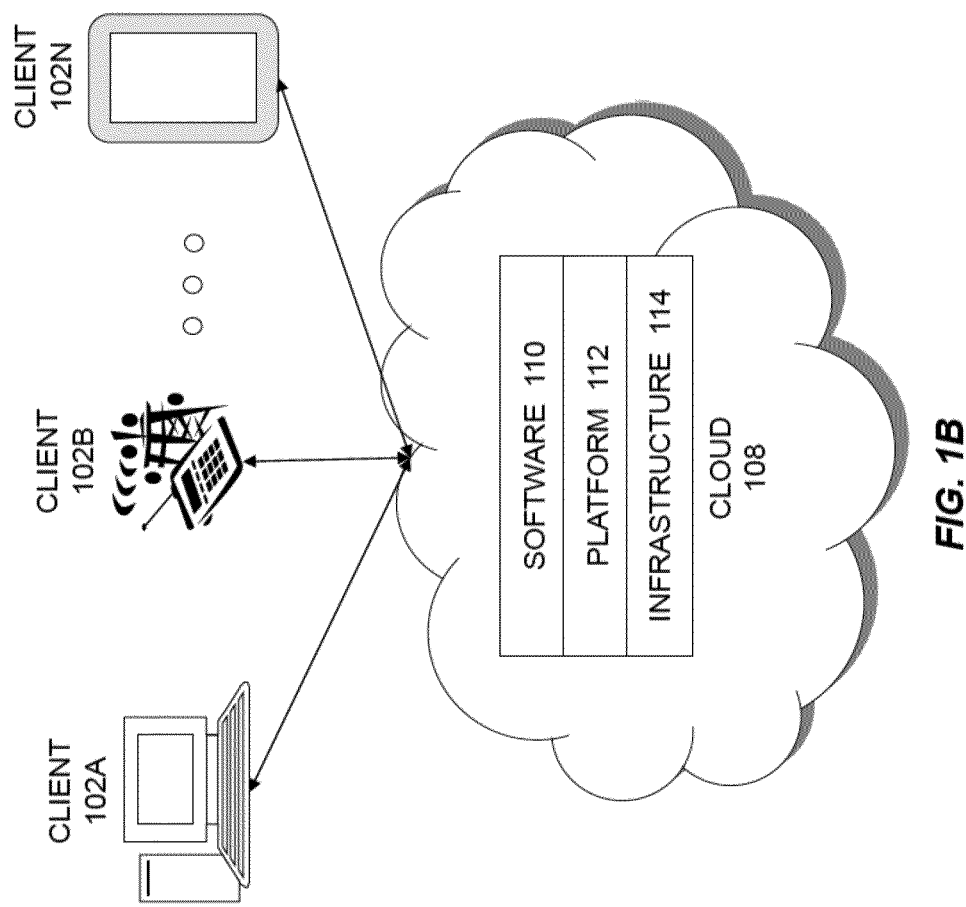
FIGS. 1B-1D are block diagrams depicting embodiments of computers useful in connection with the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a network grant and charge management system (NGCS) 202. The I/O controller 123, in some embodiments, is further connected to a key board 126, and a pointing device 127. Other embodiments may include an I/O controller 123 connected to more than one input/output device 130A-130N.

Figure 1C:
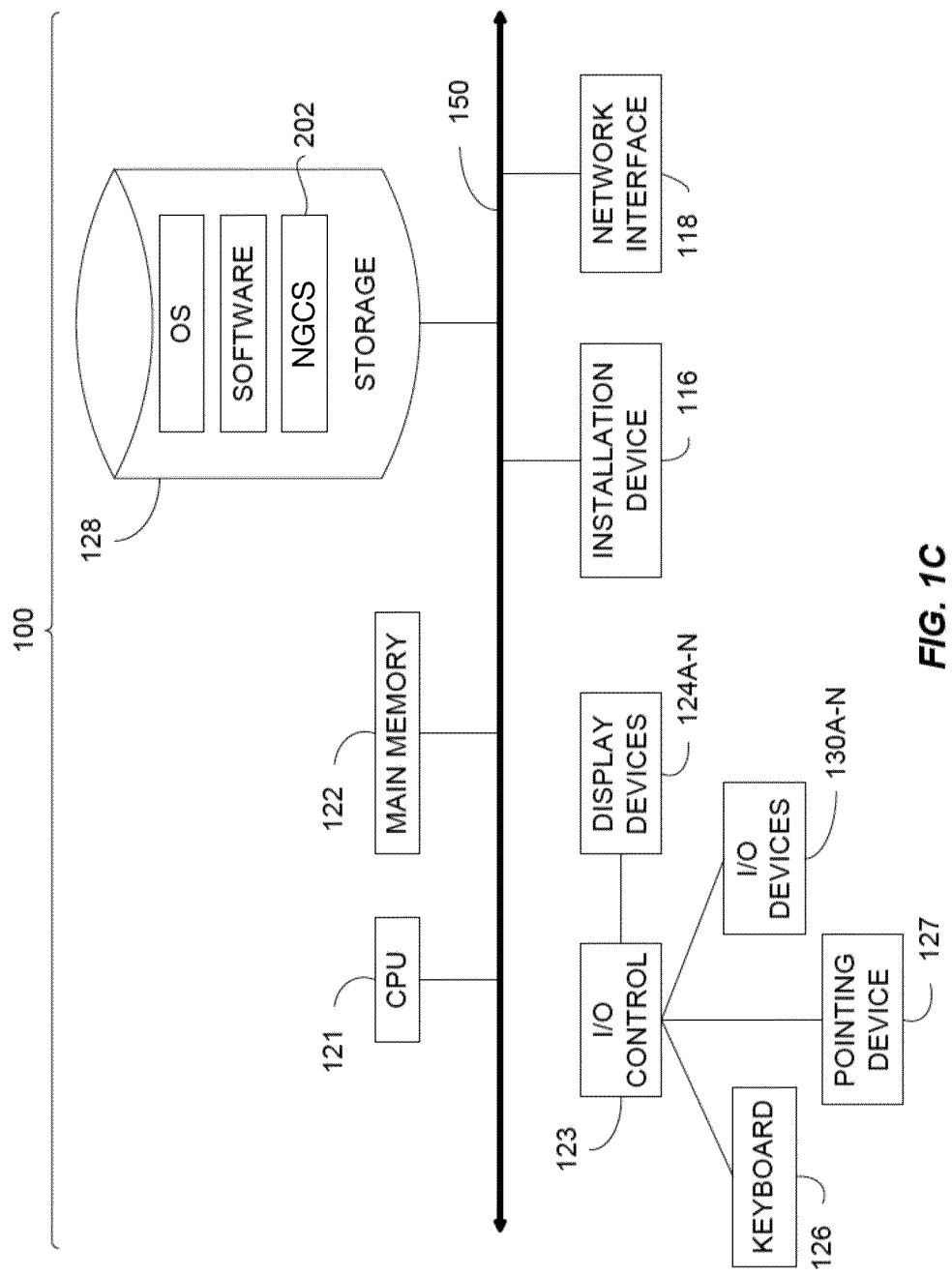
Figure 1D:
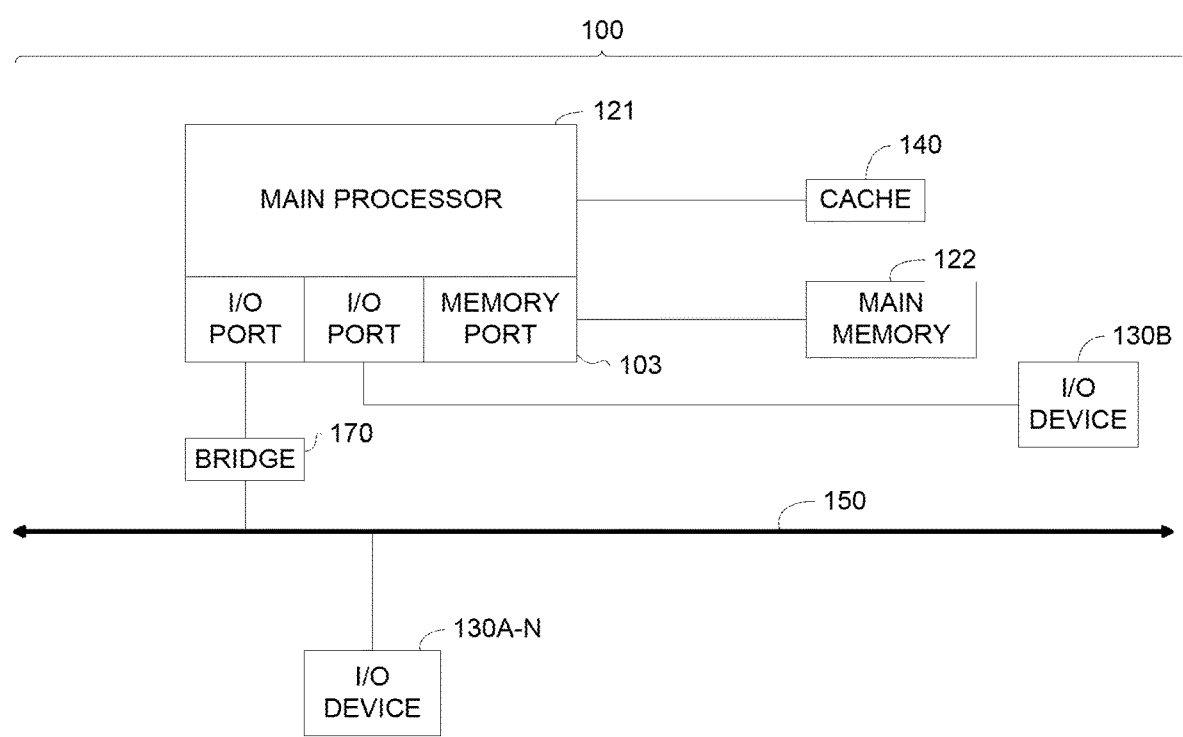

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a NGCS 202, or any portion of a NGCS 202. The computing device 100 may further include a storage device 128 that can be either one or more hard disk drives, or one or more redundant arrays of independent disks; where the storage device is configured to store an operating system, software, programs applications, or at least a portion of the NGCS 202. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Reducing Traffic Flow Between a Network and Online Charging Solution

Telecommunication service providers want an accurate representation of a subscriber's balance and data consumption in real time. Without up to date balance information, a subscriber may consume more data than the subscriber's plan provides, which can result in unintended overages for the subscriber. However, increasing the frequency at which subscribers' devices report to the service provider's online charging solution can result in significantly high network traffic and computational costs.

The present solution relates to an improved system and method for reducing traffic flow between the network and the online charging solution. The methods and systems described herein can provide a mediator (or buffer) between the network and the online charging solution. The mediator can be controlled independently of the online charging solution, and for each device on the network, can run an active mediation instance that maintains a quota cache. The online charging solution can, for each device, provide the mediator a quota of a service that is allocated out to the device over a given period of time. The mediator can be configured to implement a plurality of policies according to which the mediator serially allocates a plurality of network grants to the device, reports usage of the device, and reports charges based on the usage of the device to the online charging solution. The mediator can be configured to manage a plurality of quotas for a plurality of services available to a single device. Examples of services can include data, voice, text messaging, among others. In some implementations, the services can be more granular, including but not limited to video data, data consumed by a particular application, data received from servers of a particular domain, among others. In some implementations, the services can be based on deep packet inspection. For instance, a service, for example, data consumed by a video conferencing application can be identified by applying a deep packet inspection to the data packets to identify an IP address (source or destination) that matches an IP address of the video conferencing application. In some implementations, a combination of a URL and a port number may be used to determine if the consumption relates to a particular service.

The mediator can be configured to execute an active mediation instance for each service provided to a device. The mediator can configure the active mediation instance to operate according to a subscriber specific configuration. As subscribers may sign up for different subscription plans or usage plans, each active mediation instance can be tailored based on the subscriber. Each active mediation instance includes a quota cache for each service consumed by the device. The quota cache of a service includes a quota of an amount or quantity of the service allocated by the online charging solution to the mediator for a particular subscriber or device. The action mediation instance may execute a network grant policy that allocates a portion of the quota of the service allocated by the online charging solution to the device. The active mediation instance can allocate another portion of the quota of the service prior to the consumption of the portion of the service quota or the expiration of the portion. The active mediation instance can also monitor consumption of the allocated portions of the quota of the service by the device and report the consumption to the online charging solution according to a predefined consumption reporting schedule. The consumption reporting schedule can be defined by a consumption reporting policy that may be established by the online charging solution. The active mediation instance may also monitor the charges associated with the consumption by the device and report charges to the online charging solution according to a charge reporting schedule. The charge reporting schedule can be defined by a charge reporting policy that may also be established by the online charging solution.

The mediator may be independent of the online charging solution. That is, the mediator may not know the specific price plan to which the subscriber subscribes or have any additional details relating to the subscriber. The mediator can be configured to integrate with any online charging solution. The mediator can be highly available and stateless. The mediator can also allow for subscriber specific and price plan specific configurations. These configurations can be provided by the online charging solution to the mediator. These configurations can include the quota allocation policy, the network grant policy, the consumption reporting policy and the charge reporting policy, among others. As these policies may be configured or generated by the online charging solution, the online charging solution can control how much quota of the service to allocate, the frequency at which to receive consumption and charge reports, among others.

Figure 2:
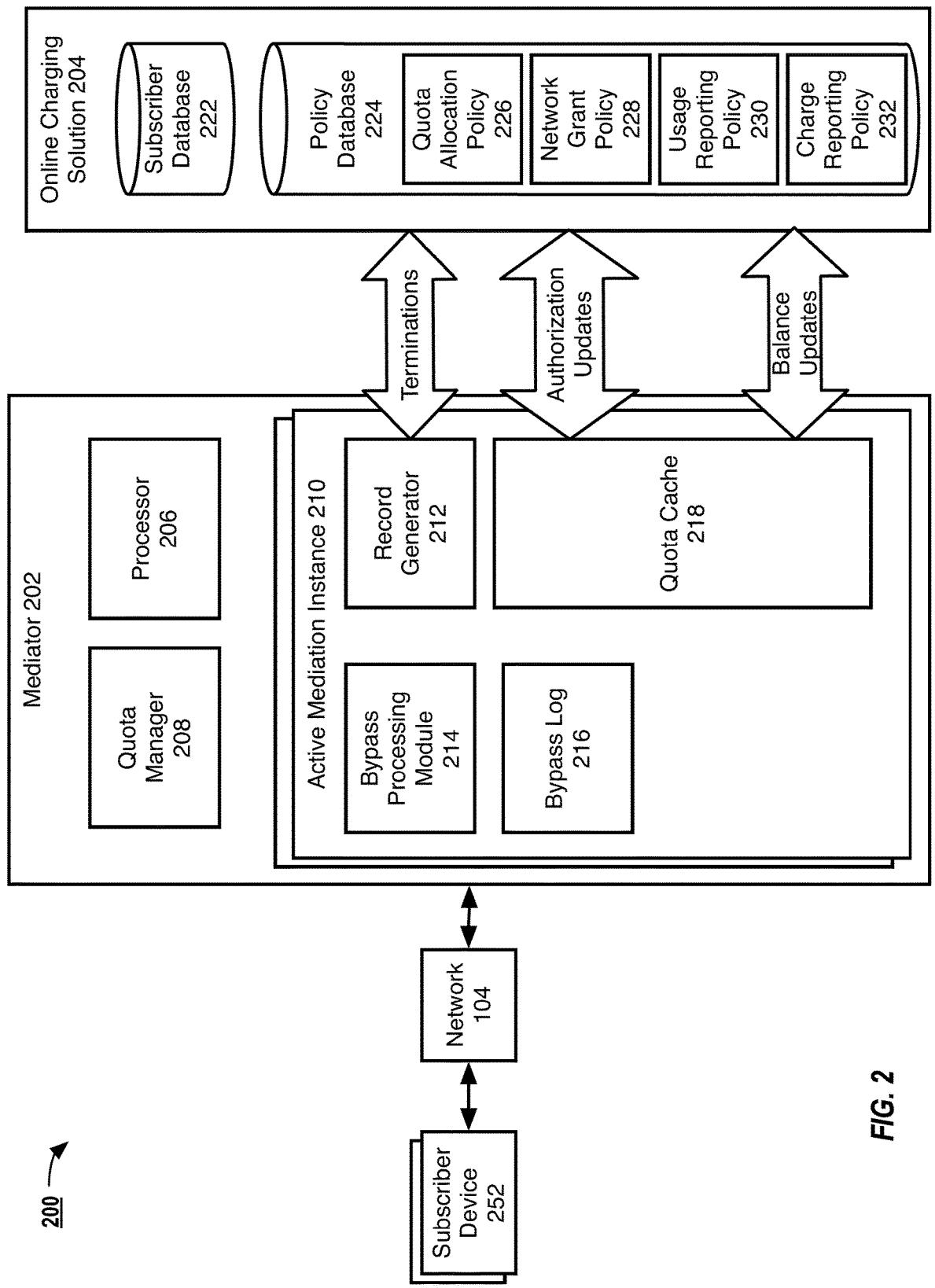
FIG. 2 is a block diagram illustrating an example implementation of a reporting system environment.

FIG. 2 is a block diagram illustrating an implementation of a reporting system environment 200. The environment 200 includes a mediator 202 configured between an online charging solution (OCS) 204 and plurality of devices 252 and a network 104. The devices 252 subscribe to the services offered by a service provider that can utilize the OCS 204 for monitoring service consumption by subscribers as well as managing subscription charges of subscribers.

The mediator 202 is in communication with the plurality of devices 252 via the network 104. The mediator 202 includes one or more processors 206. The mediator 202 also includes a quota manager 208 that manages one or more active mediation instances 210. Each active mediation instance 210 can include a record generator 212, a bypass processing module 214 in communication with a bypass log 216, and a quota cache 218. The record generator 212 and the quota cache 218 are in communication with the OCS 204. Additional details relating to the mediator 202 are provided below.

The OCS 204 includes one or more processors 206, a subscriber database 222 and a policy database 224. The subscriber database 222 can include subscriber information for one or more subscribers of services provided by the service provider for which the OCS 204 is managing online reporting and charging functionality. The subscriber database 222 can include data corresponding to price plans and other subscriber information associated with the device. For example, the subscriber database 222 may indicate in a table that the subscriber pays for a data plan that includes 500 talk minutes per month and 3 Gb of data. The policy database 224 can include one or more policies, including but not limited to a quota allocation policy 226, a network grant policy 228, a consumption reporting policy 230, and a charge reporting policy 232. Each of these policies can include one or more rules. Additional details relating to these policies are provided below.

The OCS 204 is configured to receive a network grant request from each of the devices 252. For example, the device 252 may issue or transmit a network grant request when the device 252 first attempts to register with the network. In some implementations, the device may attempt to register with the network when the device 252 is switched on. The network grant request can include a request for one or more services. In some implementations, the network grant request can include a request for data service, a request for voice service and a request for messaging service, among others. The network grant request may request an amount of data that can be used by the device 252. In some implementations, the network grant request of the device 252 may be directed towards the OCS 204 but may be intercepted by the mediator 202. In some implementations, the network grant request of the device is received by the OCS 204 without being received by the mediator 202. The network grant request can include information relating to the device 252, including but not limited to, one or more device identifiers unique to the device (for example, a subscriber identity module (SIM) card or an International Mobile Station Equipment Identity (IMEI) of the device). The network grant request can also include geographic information, among others.

The OCS 204 can identify one or more device identifiers from the network grant request and use one or more device identifiers included in the network grant request to identify the subscriber to which the device belongs. The OCS 204 can be configured to identify the subscriber by performing a lookup in a subscriber database 222 using the device identifiers.

The OCS 204 can allocate quotas of services to the mediator 202 in response to receiving the network grant request from the device. In some implementations, the OCS 204 can allocate a quota of a service (service quota) by communicating with the mediator 202. In some implementations, the OCS 204 can submit a request to generate a record corresponding to the device 252 for which to allocate the service quota. In some implementations, the record is generated by the mediator responsive to receiving the network grant request from the device or in response to detecting that the OCS 204 received the network grant request from the device 252.

The OCS 204 can provide, to the mediator 202, the allocation of a service quota corresponding to the device. The OCS 204 can determine an amount or size of the service quota to allocate to the device according to the quota allocation policy 226. The quota allocation policy 226 can be specific to the device, to a price plan to which the subscriber of the device subscribes, among others. The quota allocation policy can also specify a validity time associated with the service quota. The validity time can be a length of time for which the service quota is valid. In some implementations, the validity time can be a time until which the service quota is valid and may be based on a length of time from which the network grant request was received. In some implementations, the validity time can be a fixed time for a given date (for example, 11 pm every day). In some implementations, the OCS 204 can define the quota allocation policy based on a subscriber plan of the subscriber, a geography of the subscriber, or any other information related to the subscriber.

The OCS 204 can also specify one or more network grant policies 228. The network grant policy 228 can specify one or more rules according to which the mediator 202 is to allocate a resource grant to the device. In some implementations, the network grant policy 228 can specify one or more rules for the timing and size of the resource grants issued to the device 252 and how the service quota allocated by the OCS 204 to the mediator 202 should be divided into a plurality of resource grants to be issued to the device 252 by the mediator 202. The network grant policy can specify, for each resource grant allocation, a size of the resource grant and an expiration period of the resource grant to determine when the resource grant will expire. The mediator 202 will implement the network grant policy. The quota allocation policy can also indicate a network grant policy that includes The OCS 204 can also specify one or more consumption reporting policies 230 according to which the mediator 202 will report the device's consumption of the service in each of the allocated resource grants. The consumption reporting policy 230 can specify one or more rules according to which the mediator 202 is to report the consumption of one or more resource grants of the service to the OCS 204. For example, the consumption reporting policy 230 can indicate that the mediator 202 report the consumption once every predetermined time duration (for example, 4 hours). The consumption reporting policy 230 can also indicate that the mediator 202 report the consumption each time a resource grant is fully consumed or the resource grant expires.

The OCS 204 can also specify one or more charge reporting policies 232 according to which the mediator 202 will report the device's charges of the service based on the device's consumption of the service in each of the allocated resources. The charge reporting policy 232 can specify one or more rules according to which the mediator 202 is to report the charges for the service during one or more resource grants to the OCS 204. For example, the charge reporting policy 230 can indicate that the mediator 202 report the consumption of the service once every predetermined time duration (for example, 6 hours).

The mediator 202 acts as an intermediary to the plurality of devices 252 and network 104 and the OCS 204. The mediator 202 can execute a plurality of active mediation instances 210. In some implementations, the mediator 202 can execute one or more active mediation instances 210 for each of the devices 252 of the environment 200. In some implementations, the mediator 202 can execute a different instance of the active mediation instance 210 for each of the services (e.g., text, voice, and data) used by a device 252. In some implementations, the mediator 202 can execute an active mediation instances 210 for each service offered to each of the devices 252 of the environment 200. In some implementations, the active mediation instance 210 can be an application, program, library, service, task or any type and form of executable instructions executable by the processor 206 of the mediator 202.

The quota manager 208 of the mediator 202 manages the active mediation instances 210. In some implementations, the quota manager 208 can be configured to communicate with the OCS 204 and may be configured to cause the mediator 202 to establish a new active mediation instance 210 responsive to the OCS 204 transmitting a request to provide a network grant to a device 252. In some implementations, the quota manager 208 may be configured to cause the mediator 202 to establish a new active mediation instance 210 for each service identified in the request to provide a network grant to a device 252.

Each active mediation instance 210 includes a quota cache 218. The quota cache 218 is configured to provide one or more resource grants of a service to the device 252 to which the active mediation instance 210 corresponds. In some implementations, the quota manager 208 can allocate one or more resource grants of the service to the device. The quota manager 208 can allocate the resource grants from a service quota allocated to the mediator 202 by the OCS 204 for a particular service of a particular device 252. As such, the resource grants are portions of the service quota provided by the OCS 204 to the mediator 202 for a specific device 252. The quota manager 208 can provide a plurality of resource grants to the device 252 over a given time period. The quota manager 208 can provide the plurality of resource grants serially to the device 252. For example, the quota manager 208 can provide a first resource grant of a service at a first time, and at the expiration of the first time, the quota manager 208 can provide a second resource grant of the service to the device 252. The quota manager 208 can also provide a new resource grant of the service when a previous resource grant is consumed. In some implementations, the quota manager 208 can allocate a resource grant to the device according to a network grant policy. The network grant policy can include one or more rules according to which the quota manager 208 can allocate resource grants of the service to the device. The network grant policy can be specific to a particular type of service. In some implementations, the quota manager 208 can allocate a resource grant having a grant size and an expiration time. The grant size and the expiration time may be determined according to the network grant policy. The grant size can specify the size of the network grant. In some implementations, the grant size may not exceed the size of the service quota allocated to the mediator 202 by the OCS 204. The expiration time may be a specified time at which the resource grant expires. In some implementations, the expiration time may be a time duration over which the resource grant is valid. For example, the resource grant may be valid for a predetermined time duration from the time the resource grant was issued or allocated by the quota manager 208 to the device 252.

In an example, the OCS 204 may provide, as a service quota, 50 MB of data to be provided to a device 252 during a 24-hour period. The OCS 204 can provide the 50 MB to the quota cache 218 of the active mediation instance 210 associated with the respective device 252. The quota manager 208 of the mediator 202 may then divide the 50 MB into a plurality of resource grants—for example, five 10 MB resource grants. In some implementations, the quota cache 218 may do so according to the network grant policy corresponding to the device 252. Each of the resource grants can be valid for a predetermined amount of time. The predetermined amount of time can be defined by the start and end time or by a time length. For example, a resource grant may expire at a predetermined time (e.g., 11 AM) or after a predetermined amount of time (e.g., 4 hours). In some implementations, each of the resource grants can be of a different size. For example, a first resource grant can be 10 MB while the second resource grant may be 20 MB. The size of each of the resource grants can be provided by the network grant policy associated with the device 252.

The quota manager 208 can also be configured to receive a plurality of consumption reports from the plurality of devices 252 for which the mediator 202 serves as an intermediary to the OCS 204. In some implementations, the quota manager 208 can receive, for each device, one or more consumption reports relating to consumption of the service by the particular device 252. In some implementations, the quota manager 208 can be configured to receive information related to the consumption of resources by the device 252 and may generate a consumption report from the received information. The consumption reports based on the device's usage can identify the amount of resources (e.g., minutes used, text messages sent, or data used) consumed by the device 252. In some implementations, each of the consumption reports corresponds to one of the resource grants allocated to the device 252.

The quota manager 208 can be configured to aggregate the consumption reports received from the device. The quota manager 208 may store consumption report related information in the quota cache 218. The quota manager 208 can be configured to identify, from the consumption reports received from the device, information related to the amount of the service consumed by the device. In some implementations, the consumption reports may be received from some other entity in the network that monitors the consumption of the service by the device. In some implementations, the consumption report may be generated by the mediator 202 based on consumption of the service by the device.

The quota manager 208 can be configured to report consumption statistics to the OCS 204. In some implementations, the quota manager 208 may report the consumption statistics periodically. In some implementations, the quota manager 208 may report consumption statistics according to a consumption reporting policy 230. As described above, the consumption reporting policy 230 can specify one or more rules according to which the quota manager 208 is to report the consumption of the service by the device to the OCS 204. For example, the consumption reporting policy 230 can indicate that the mediator 202 report the consumption once every predetermined time duration (for example, 4 hours). The consumption reporting policy 230 can also indicate that the mediator 202 report the consumption each time a resource grant is fully consumed or the resource grant expires. It should be appreciated that the frequency at which consumption reports are provided to the OCS and the accuracy at which the OCS 204 can reduce overage costs may be directly related. However, the frequency at which consumption reports are provided to the OCS may be inversely related to the amount of processing the OCS 204 will have to perform, In some implementations, the number of consumption reports provided to the OCS 204 by the mediator 202 is dependent on the consumption reporting policy 230. The consumption reporting policy 230 can identify a consumption reporting time and a consumption reporting size and can include one or more rules for providing consumption reports to the OCS 204. For example, the consumption reporting policy 230 may indicate that a consumption report updating the balance of the device 252 should be sent to the OCS 204 every 6 hours. The quota manager 208 may monitor the time since the last consumption report was generated and sent to the OCS 204. When the monitored time is equal to or exceeds a consumption reporting time as indicated by the reporting policy, the quota manager 208 can provide the OCS 204 with a consumption report.

For example, the resource grant may be a 10 MB allocation to a specific device 252. The resource consumption report may indicate that over the active time (e.g., between the start and expiration of the resource grant) of the resource grant, the device 252 used, for example, 9 MB of data. The quota manager 208 can aggregate the information from the plurality of consumption reports to generate a report of the total amount of resources used by the device 252 over a given time period. For example, if the quota of services is 50 MB for a given day and the quota cache 218 divides the 50 MB quota of services into five 10 MB resource grants, and if over the given day, the device 252 used 9 MB of the first resource grant, 10 MB of the second resource grant, 7 MB of the third resource grant, and 10 MB of the fourth and fifth resource grant, the quota manager 208 can aggregate the information to report that the device 252 used 46 MB of the 50 MB service quota over the given day. The quota manager 208 may then report this information to the OCS 204 once per fixed time interval (for example, a day), at the expiration of the service quota, or when the device 252 consumes the full service quota.

In the event that the device gets disconnected from the network and is unable to consume additional service, a charge report may be generated responsive to detecting that the device is no longer connected to the network. In some implementations, the charge report may be generated according to a predetermined reporting schedule. In some implementations, if the device reconnects to the network, the device can be issued a new resource grant. This resource grant can be of a size that is the difference between the previous resource grant size and the amount of service consumed by the device before the device was disconnected from the network. Further, the validity time of this resource grant can expire at the time the previous resource grant was originally supposed to expire.

As described above, the mediator 202 can reduce reporting to the OCS 204, thus reducing the computational resources the OCS 204 expends to monitor the consumption of a service (e.g., data) of the devices 252. The mediator 202 can reduce the reporting while still providing the OCS 204 an accurate view of the service consumption in the environment 200. In a system without a mediator 202, each of the consumption reports of a service from the device 252 would be sent directly to the OCS 204. These consumption reports could number in the tens to hundreds per day per device 252. In the environment 200 described herein, the OCS 204 provides the quota cache 218 with one authorization and a service quota per given time period (e.g., 1 day). The mediator 202 provides resource grants to the device 252 and receives each of the consumption reports from the device 252. The mediator 202 can then provide the OCS 204 with balance updates in response to the subscriber's consumption of the resource grants corresponding to the service. In the above example, where the service quota was divided into five resource grants, the mediator 202 may only send the OCS 204 five consumption report updates per day per device 252 rather than the tens to hundreds of updates per device 252 that would be sent to the OCS 204 without a mediator 202.

It should be appreciated that by utilizing the mediator 202 between the network and the OCS 204, the mediator can account for device consumptions of service even if network activity of a device failed to get reported to the OCS 204. This is possible because the mediator 202 can track and record outstanding network grants and generate charge reports responsive to the network grant being consumed entirely or if the network grant expires according to a predetermined validity time. In this way, the mediator 202 can persist the consumed service quota reported from the network to allow recovery of a failed node without loss of reported network activity, for instance, activity that has not been reported or charged to the OCS yet.

Figure 3:
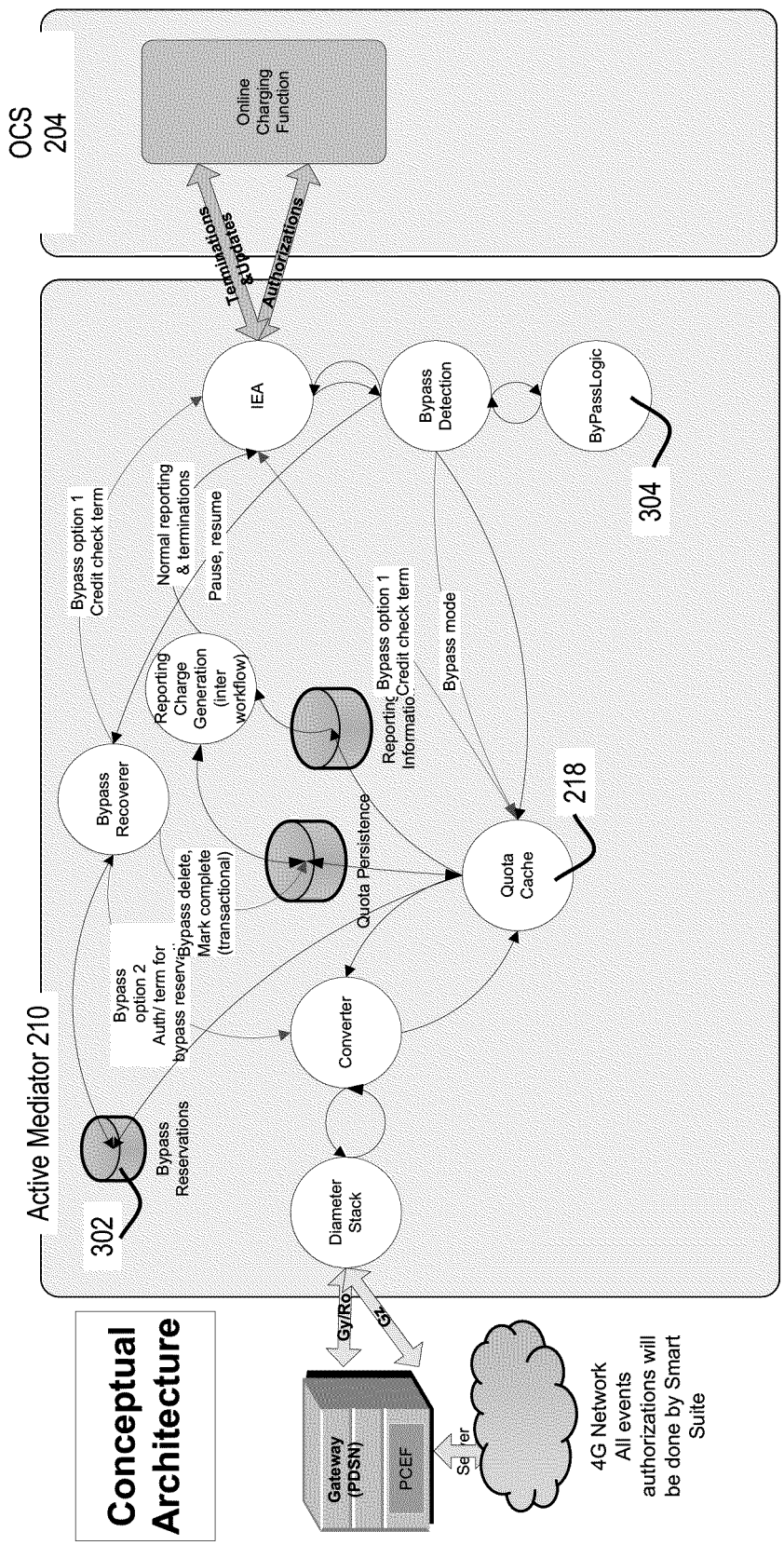
FIG. 3 is a block diagram depicting an example of the quota cache architecture with a bypass feature.

FIG. 3 is a block diagram depicting an implementation of the quota cache 218 architecture with a bypass feature. As illustrated, the OCS 204 authorizes device 252 and provides at least one service quota to the mediator 202. The mediator provide resource grants based on the service quota allocated by the OCS 204 for the device 252. The mediator 202 receives consumption reports from the device 252. In some implementations, the device may have already consumed the allocated services reserved for the device 252. In these implementations, the quota manager 208 can look to the bypass reservations 302 to determine if the device 252 has a bypass balance. The bypass logic 304 may be used to determine if, when the device 252 has exhausted the quota, the device 252 can continue to receive additional data. For example, if the bypass logic 304 determines that the there is no bypass logic associated with the device 252, the device 252 may not be provided additional data. However, if a balance is associated with the device 252, then the device 252 may be allowed to receive additional data.

Figure 4:
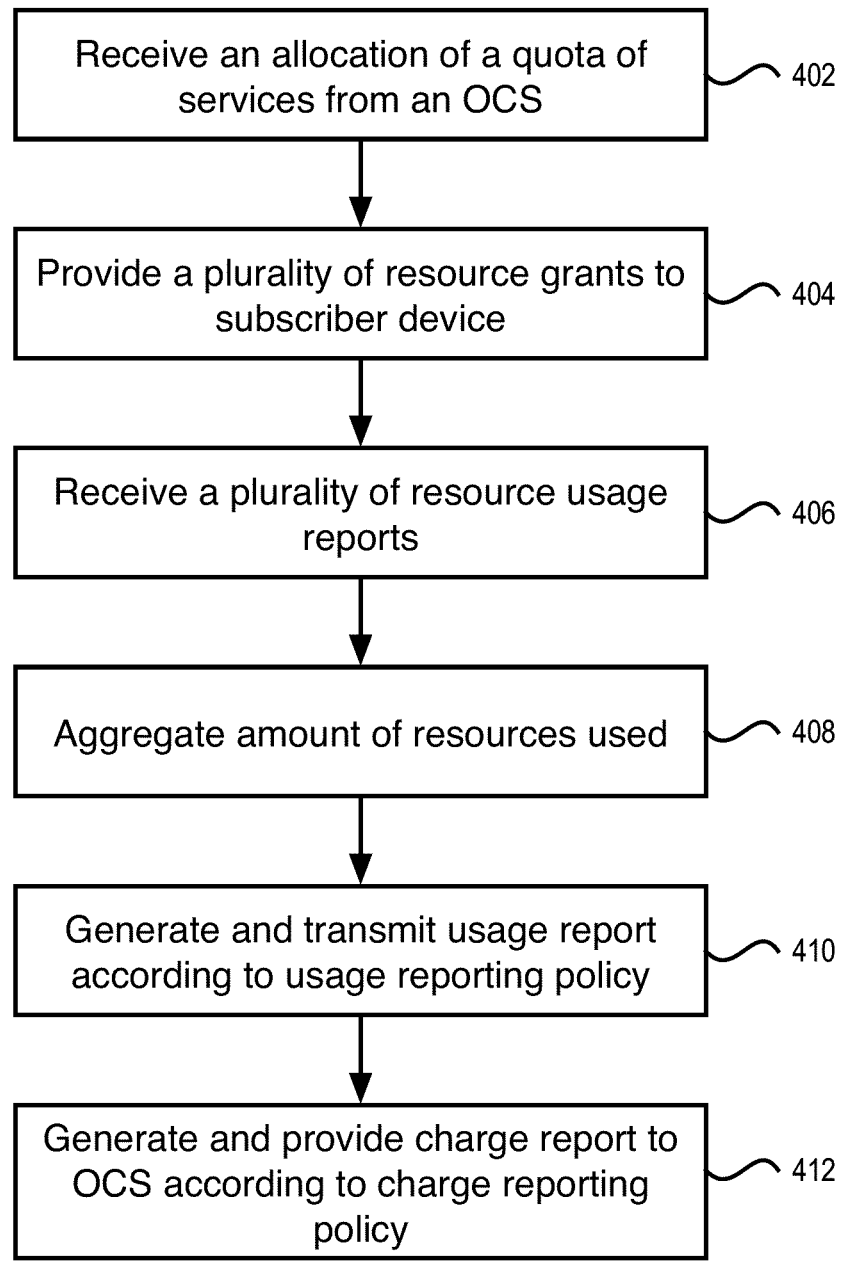
FIG. 4 is a flow chart of an example method for reducing traffic flow between a network and an online charging solution.

FIG. 4 is a flow chart of a method for reducing traffic flow between a network and an OCS. The method includes receiving, by the mediator from the OCS, for a service provided to a device, an allocation of a quota of the service according to a quota allocation policy established by the online charging solution (BLOCK 402). The mediator provides, for the service and corresponding to the allocation of the quota of the service, a plurality of resource grants to the device, each resource grant of the plurality of resource grants having a size limit and a time period (BLOCK 404). The mediator receives a plurality of resource consumption reports corresponding to the plurality of resource grants (BLOCK 406). The mediator determines an aggregate amount of resources of the service based on a sum of the amounts of resources used by the device identified in each of the plurality of resource consumption reports (BLOCK 406). The mediator generates for the service, a charge report identifying the aggregate amount of resources responsive to the device consuming the allocated quota of the service or an expiration of the validity time (BLOCK 410). The mediator provides, for the service provided to the device, the charge report responsive to the device consuming the allocated quota of the service or an expiration of the validity time (BLOCK 412).

As set forth above, and in greater detail, the method includes receiving, by the mediator from the OCS, for a service provided to a device, an allocation of a quota of the service according to a quota allocation policy established by the online charging solution (BLOCK 402). The online charging solution can allocate a service quota (e.g., network data) for a device. The OCS can allocate the service quota in response to a request for a service from a device. In some implementations, the OCS can allocate service quotas for a plurality of services, such as voice, data, text, among others in response to receiving a network grant request from the device. In some implementations, the OCS can receive a request to allocate one or more service quotas from the device in response to the device connecting to the network, for example, by being switched on. The network grant request can identify the device to the OCS. The OCS can then determine if the device is a subscriber of the OCS and has a current and active account by determining if there is a subscriber record associated with the device identifier in a subscriber database of the OCS. The OCS can allocate the service quota according to a quota allocation policy. The quota allocation policy can be established by the OCS. If the device is a subscriber the OCS can retrieve a quota allocation policy from the policy database maintained by the OCS. The OCS can determine a size. The quota allocation policy can indicate a quota grant size indicating a quota size for the service to allocate to the device. The quota allocation policy can also indicate a quota validity time for which the service quota is valid. For example, the service quota may be valid for 24 hours after the device was authorized with the OCS.

In some implementations, the service quota may be valid of a predetermined amount of time from the time the OCS received a request to allocate the service quota or from a time the OCS provides the mediator the service quota for the device. In some implementations, the quota allocation policy can be specific to a particular device or can be specific to a particular subscription plan, geographic location, device type, among others.

The mediator can receive a plurality of allocations of a service quota from the OCS. The mediator can receive an allocation of a service quota for each device in response to a network grant request from a device. The mediator can receive the allocation of a service quota from the OCS per allocation period. The allocation period can be based on a predetermined time duration. For example, once every 24 hours. In some implementations, the allocation period may be based on the utilization of the service quota by the device. In some implementations, the OCS may allocate a service quota each time the device corresponding to the service quota consumes the service quota.

The mediator may generate, create or otherwise establish an active mediation instance for each device. In some implementations, the mediator may receive the allocation of the service quota from the OCS. In some implementations, the quota manager of the mediator may generate the active mediation instance and a record generator of the active mediation instance may communicate with the OCS to receive the allocation of the service quota.

The method also includes providing a plurality of resource grants to the device (BLOCK 404). The mediator can provide a plurality of resource grants to the device. The mediator can allocate, from the allocation of the service quota, a plurality of resource grants for the device. The mediator can then provide, to the device, the plurality of resource grants. In some implementations, the mediator can provide the plurality of resource grants one at a time or serially.

In some implementations, the mediator divides the service quota allocated by the OCS into a plurality of resource grants. As such, the aggregate size of the plurality of resource grants can be equal to or less than the service quota allocated by the OCS. Each of the resource grants can include a portion of the data provided by the service quota. The mediator can allocate and provide the resource grants according to a network grant policy. The network grant policy can be established or maintained by the OCS. The mediator can communicate with the OCS and receive the network grant policy from the OCS. In some implementations, the network grant policy can specify a resource grant size and a resource grant validity time. The resource grant size can specify a size of the resource grant to allocate. The resource grant validity time can specify a time duration for which the resource grant is valid. At the expiration of the time duration, the mediator can provide another resource grant to the device. The mediator can also provide subsequent resource grants to the device if the active resource grant expires or if the device consumes the entire resource grant. As described, each of the resource grants can also be valid for a portion of the time that the service quota is valid. For example, a second resource grant may be activated after the expiration time of a first resource grant that is issued to the device. As an example, the service quota may be valid for a total of 12 hours from 7 AM to 7 PM, and four resource grants may be provided, each of which are valid for a 3 hour time within the 12 hours of the service quota. The first resource grant may be valid from 7 AM to 10 AM, the second resource grant may then be valid from 10 AM to 1 PM, and so on. Each of the resource grants can be of equal or different amounts of services and be valid for equal or different amounts of time.

The mediator receives a plurality of resources consumption reports from the device (BLOCK 406). In some implementations, each of the plurality of resource consumption reports can correspond to one of the resource grants issued by the mediator to the device. In some implementations, the resources consumption reports can be independent of the resource grants issued by the mediator. As described above, each of the resource grants indicates a portion of the service quota the device is allotted during a specific time frame. The consumption report received by the mediator from the device can indicate what portion of the resource grant the device used. In some implementations, the consumption report is sent to the mediator when the resource grant expires. In some implementations, the consumption report is sent to the mediator when (or if) all the resources of the resource grant are consumed. For example, assume a resource grant is for 10 MB and is set to expire at 7 PM. If the device consumes the 10 MB at 5:43 PM, the device may send the consumption report to the mediator at substantially about 5:43 PM. In another example, if the device does not consume the 10 MB of data at 7 PM, the device may send to the mediator a consumption report that indicates what portion of the 10 MB the device did consume.

The mediator determines an aggregate amount of resources of the service based on a sum of the amounts of resources used by the device identified in each of the plurality of resource consumption reports (BLOCK 408). The mediator can receive a plurality of resource consumption reports or otherwise monitor and determine usage by the device. The mediator can aggregate the usage by the device. The mediator can identify the usage from each of the plurality of resource consumption reports and aggregate the identified usage. The mediator can, via the quota manager, store the consumption reports and the aggregated usage in the quota cache of the active mediation instance corresponding to the device that is maintained by the quota manager. In some implementations, the mediator may store the consumption report until the resource grant expires. When the resource grant expires, the amount of data used by the device can be aggregated. For example, the used data, as reported by each of the consumption reports corresponding to each of the resource grants, can be summed to determine how much data was consumed by the device while the service quota was valid.

The mediator can generate for the service, a charge report identifying the aggregate amount of resources responsive to the device consuming the allocated quota of the service or an expiration of the validity time (BLOCK 410). The consumption reporting policy can include one or more rules according to which to provide consumption reports to the OCS. The consumption reporting policy can be specific to the device. The consumption reporting policy can be established by the OCS and stored in the policy database maintained by the OCS. In some implementations, the consumption reporting policy can be established by the device. The consumption report received by the mediator can include an identifier of the device and include the amount of data that was consumed by the device. In some implementations, the amount of data consumed by the device is a portion or all of the service quota. The mediator can identify usage from the device and generate a consumption report to provide to the OCS. In some implementations, the mediator can generate the consumption report based on information received from the usage of the device. The mediator can then provide the generated consumption reports to the OCS. In some implementations, the consumption reporting policy can specify the frequency at which the consumption reports are to be provided to the OCS. In some implementations, the consumption reporting policy can specify that the consumption reports are to be provided once per time period (for example, once per 6 hours). In some implementations, the consumption reporting policy can specify that the consumption reports are to be provided each time the resource grant provided by the mediator to the device expires or is fully consumed. In some implementations, the specifics of when the mediator reports to the OCS for a specific device may be based on a consumption reporting policy associated with the device. For example, a first consumption reporting policy associated with a high data use device may be configured to report back to the OCS relatively more often than a second consumption reporting policy associated with a low data use device.

The mediator can provide for the service provided to the device, the charge report responsive to the device consuming the allocated quota of the service or an expiration of the validity time (BLOCK 412). The charge report can include an identifier of the device and include the amount of data that was consumed by the device or an amount of money to charge the device based on the usage. The mediator can generate the charge report according to the charge reporting policy. The mediator can provide the charge reports to the OCS once per time period (for example, once every 12 hours). The frequency at which the charge reports are provided to the OCS can be specified in the charge reporting policy. In some implementations, the OCS can specify the frequency at which the mediator is to provide charge reports to the OCS. The mediator can provide the charge report to the OCS. The charge report can be transmitted to the OCS at either the expiration of the service quota or when the service quota is completely consumed. The specifics of when the mediator reports to the OCS for a specific device may be based on a charge reporting policy associated with the device.

Figure 5:
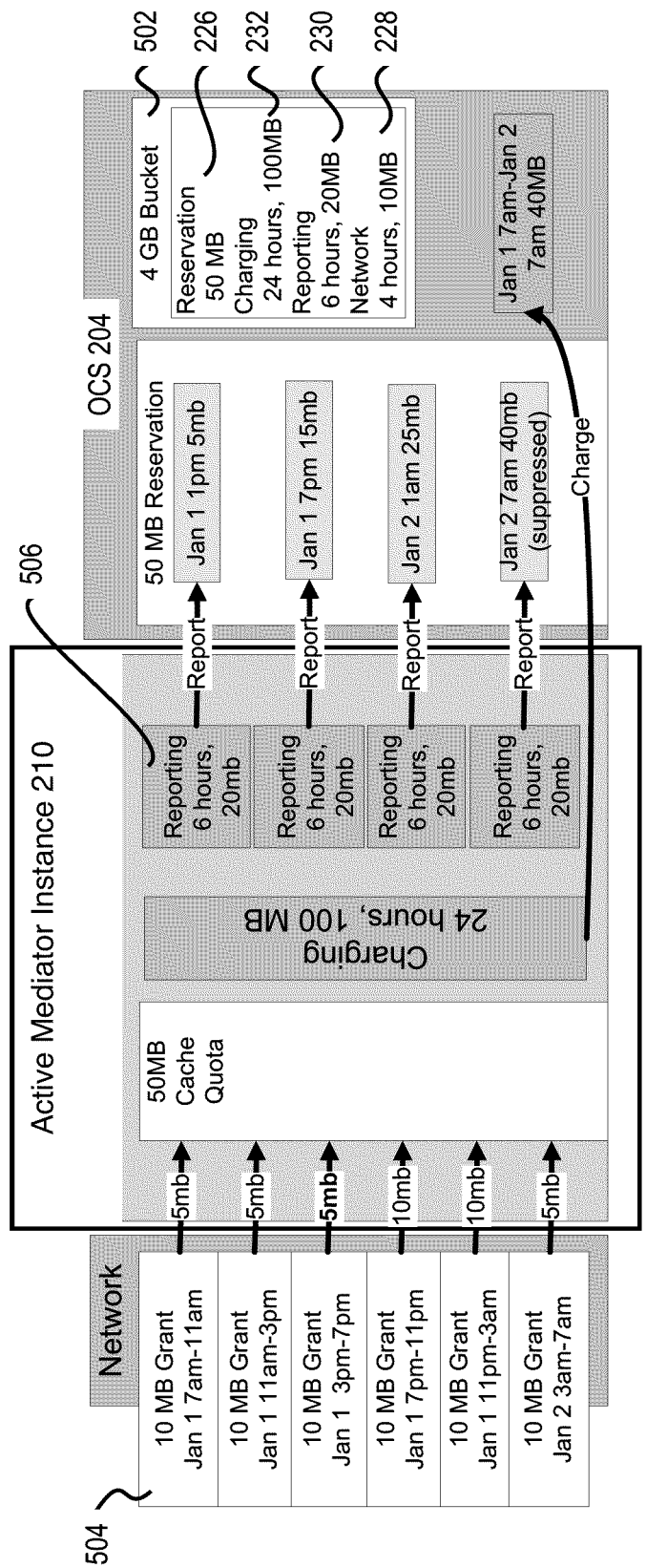
FIG. 5 is a block diagram illustrating an example of the allocation of a quota of services to a client device.

FIG. 5 is a block diagram illustrating the allocation of a service quota to a device. Responsive to the OCS 204 authorizing a device as a subscriber, the OCS 204 identifies a service quota 502 for a service associated with the device. The service quota 502 may be specific to the device and can include one or more policies. In some implementations, the service quota 502 can include a quota allocation policy 226, a network grant policy 228, a consumption reporting policy 230 and a charge reporting policy 232. The service quota 502 indicates that a 50 MB reservation is to be provided to the quota cache 218 of the mediator 202 for the specific device. The service quota is allocated to the device as six resource grants over a time period of 7 AM on Jan 1 to 7 AM on Jan 2. The six resource grants are allocated by the mediator according to the network grant policy 228. The device provides consumption reports 504 to the mediator 202 at the expiration of each of the consumption reports. As illustrated, each of the resource grants lasts for 4 hours with the first expiring at 11 AM on Jan 1 and the sixth expiring at 7 AM on Jan 2. The consumption report indicates to the mediator how much of the resource grant the device used during the given time period. For example, during the valid time of the fourth resource grant, the device reported back that the device used 10 MB of data. The mediator 202 receives and aggregates each of the consumption reports from the device. The mediator 202 can then provide consumption reports to the OCS according to the consumption reporting policy 230. The consumption reporting policy specifies generating and providing a consumption report 506 every 6 hours or at the consumption of 20 MB. In the example, when the first consumption report is generated at 1 PM on Jan 1 the device has indicated to the mediator 202 that the device has consumed 5 MB of data. When the third consumption report is generated at 1 AM on Jan 2 the mediator 202 has aggregated the received consumption reports (corresponding to consumption reports 1-4) to determine that by 1 AM on Jan 2 the device has consumed a total of 25 MB of data. With the receipt of the consumption reports, the OCS 204 can determine if the device has consumed all of the service quota and may charge the user of the device for the consumption of data associated with the service quota. In the example illustrated in FIG. 5 at the expiration of the service quota the subscriber has only used 40 MB of the 50 MB quota. In the example illustrated in FIG. 5, the charge reporting policy 232 indicates that the mediator 202 should generate a charge report 506 every 24 hours or every 100 MB. As described in this example, the device used 40 MB at the end of 24 hours. As such, the mediator can generate a charge report that includes the 40 MB usage and provide the generated charge report to the OCS. The OCS can then apply the charges based on the charge report to the device's account.

C. Predictive Rating Using a Buffer

Current network-based online charging solutions are fast and highly available but have simple rating capability and are inflexible. These systems are intentionally simple to achieve low latency and high availability. These systems are characterized by simple customer structures and limited configurability and often manage a limited number of balances for consumption. In contrast, IT based charging systems are flexible but not typically highly available and have higher latency. These systems can provide richer functionality, depth of customer data and greater configurability, which means that these systems have lots of code executed to perform rating functions and also have a large database footprint. These IT charging systems are difficult to make highly available and require significant hardware resources to deliver low latency.

The mobile customer experience is becoming more real time, and thus it is critical to get complex functionality for charging closer to the network and achieve low latency that is expected with modern telecommunications devices. This is a base expectation of customers and can serve as a competitive differentiator for operators.

The methods and systems described herein can provide a predictive rating function that can support complex customer structures, rich rating functionality, with low latency and high availability. The methods and systems can achieve these features without the need for two rating solutions to meet the different needs of the network and IT organizations and the associated cost and complexity of running the two systems to meet the various needs of the different systems. Coordinating configuration, customer data and balance information between two systems are complex, costly, and fragile, and the present solution can eliminate these complexities and the associated cost.

The present solution relates to an improved system and method for reducing traffic flow between the network and the online charging solution using a buffer. In particular, the present solution involves the use of a buffer that provides a predictive rating. The buffer can be proactively loaded with a balance from the online charging solution. Since the balance information is a compact, distilled version of the rating results, the balance information can be easily replicated and made geo-redundant to support availability. The present solution provides a rating buffer between the network and the online charging solution. The buffer is proactively loaded with a device's balance. The buffer establishes the prioritized consumption of the device's balances by proactively sending rating requests to the online charging solution prior to receiving actual requests for a rating from the devices. This isolates the buffer from the complexity of rating code and customer structures by simply simulating the predicted rating requests. The buffer can retain balance consumption relationships without needing to replicate the complex logic of the rating engine or complex customer structures to the buffer. The buffer can also maintain a single copy of the customer balance. This is in contrast to existing systems, which often, maintain multiple copies of the balance to increase responsiveness, leading to multiple versions of the balances that cannot be reconciled as different copies of the balance may be debited at different times.

Figure 6:
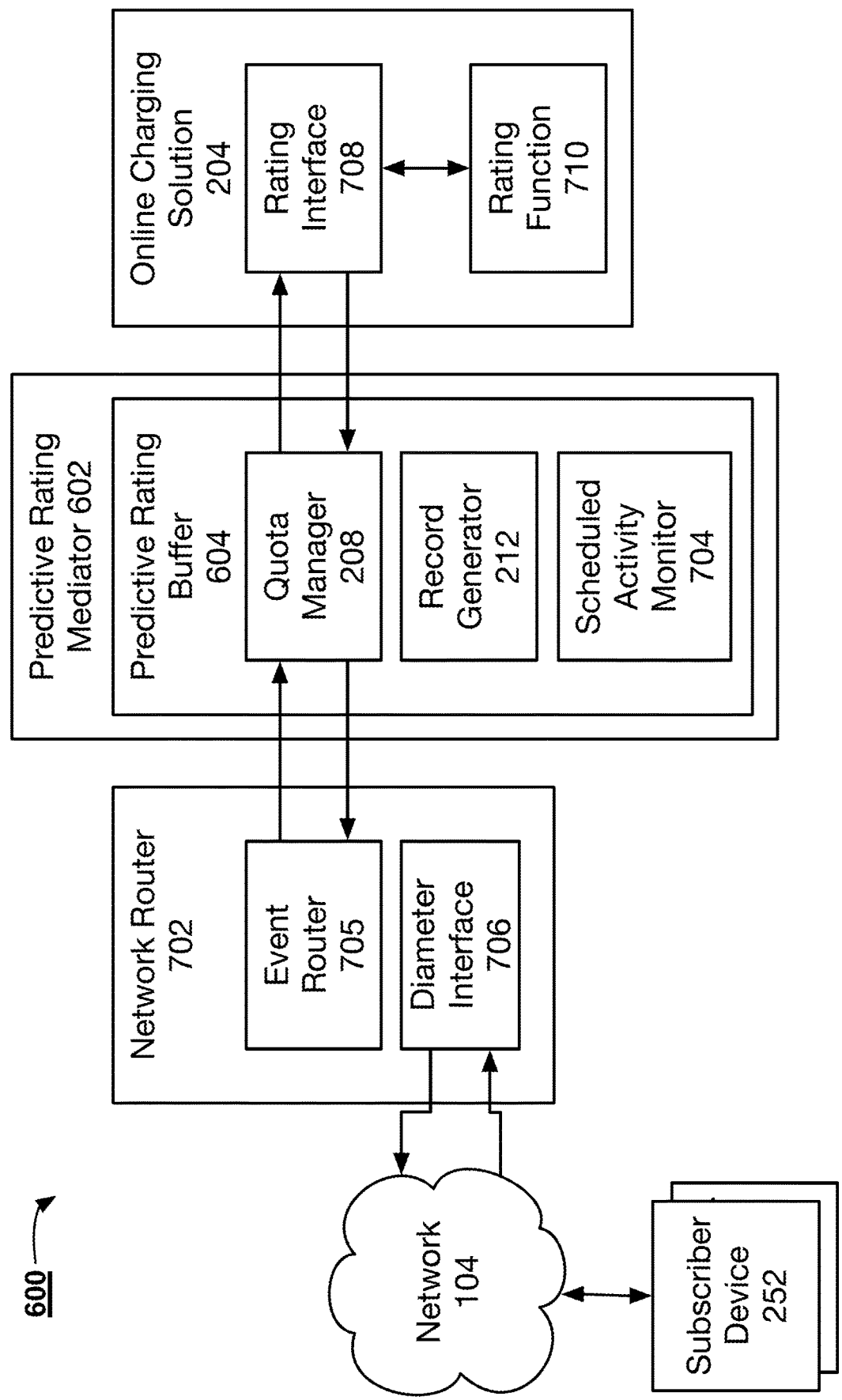
FIG. 6 is a block diagram illustrating an example implementation of a reporting system environment.

FIG. 6 is a block diagram illustrating a reporting system environment 600. The environment 600 includes a predictive rating mediator 602 that is executing a predictive rating buffer 604. The predictive rating buffer 604 includes a quota manager 208, a record generator 212, and a scheduled activity monitor 704. The predictive rating buffer 604 is in communication with an online charging solution 204, which includes a rating interface 708 and a rating function 710. The predictive rating buffer 604 is also in communication with a network router 702, which includes an event router 705 and a diameter interface 706. The network router 702 is in communication with a plurality of subscriber devices 252 via a network 104. In some implementations, the subscriber devices 252 are also referred to as devices 252.

The predictive rating mediator 602 is configured to include any of the components discussed above in relation to the mediator 202. The predictive rating mediator 602 can execute an instance of the predictive rating buffer 604 for each device 252. In some implementations, the predictive rating mediator 602 can execute a separate instance of the predictive rating buffer 604 for each service (e.g., text, voice, and data) used by each of the devices 252.

The predictive rating buffer 604 of the environment 600 is configured to receive data from the OCS 204 about which services the device 252 is subscribed. Using the receive data, the predictive rating buffer 604 can determine an available balance of network resources for the device 252 and generate primary allocation balances and contingency allocation balances for each of the services. The predictive rating buffer 604 can receive a request for a network grant for a specific service. When the predictive rating buffer 604 receives the network grant request, the predictive rating buffer 604 can generate a grant (or quota) for the service associated with the request. The generation of the primary allocation balance is responsive to a policy stored by the predictive rating mediator 602. The policy can indicate how much of each service the device 252 is allowed to consume in any given time period. The generated primary allocation balance can include, for example, a 4 GB balance for data, a 1000-minute balance for minutes, a 1000 SMS balance, and a $150 contingency balance. In some implementations, the services can be voice calls, text messages, data, among others. In some implementations, the services can be more specific, for example, specific to particular applications, domains, or data types (for instance, video). The primary allocation balances can include balances for services, for example, minutes of talk time, a number of messages (e.g., MMS and SMS), amounts of data, and a contingency quota.

Each primary allocation balance can be associated with a validity time, which can be a specific time at which the primary allocation balance expires. The predictive rating buffer 604 can also maintain one or more contingency allocation balances, which are balance not associated with a specific service. As described further below, when a primary allocation balance is exhausted, incoming grant requests can be allocated from the contingency allocation balance.

The predictive rating buffer 604 can maintain a plurality of primary allocation balances and one or more contingency balances for each of the devices 252 of the environment 600. The primary allocation balances and contingency allocation balances are described further in relation to FIG. 9. The contingency allocation balance for each device 252 can be an overflow balance to which funds are initially credited by the predictive rating buffer 604. The funds are not initially attributed to a specific service. When a primary allocation balance is exhausted (e.g., the balance reaches 0), the predictive rating buffer 604 can allocate additional balance from the contingency allocation balance, such that the device 252 can continue to use the service. For example, once a service balance is exhausted, the predictive rating buffer 604 can generate instructions that cause new grant requests to be fulfilled via the contingency allocation balance. The instructions can be generated responsive to a policy that the predictive rating buffer 604 retrieves from a database that can indicate how much of the contingency allocation balance can be moved to the exhausted service balance. In some implementations, the local quota and session cache 218 can contain multiple contingency allocation balances for each of the device 252. Once the device 252 exhausts one of its primary allocation balances, the local quota and session cache 218 can allocate additional. As additional usage is identified by the local quota and session cache 218, the predictive rating buffer 604 can debit the usage from the contingency allocation balance that was added to the service balance.

The record generator 212 of the predictive rating buffer 604 can receive usage information via the network 104 from each of the devices 252. For example, a usage message (or consumption report) can be sent from the device 252 to the record generator 212 using the Diameter protocol. The message can include a header with information that indicates from which device 252 the message originated. The body of the usage message can indicate which service and how much of the service was consumed. The record generator 212 can receive the usage message and read the usage message to determine an amount of service consumed by the device 252. For example, the predictive rating buffer 604 can receive a message that indicates that a device 252 used 23 minutes and debit the 23 minutes from the respective device's minute usage balance. In some implementations, the recorder generator 212 can store an indication of an amount of service indicated as consumed by the device 252 in a database in association with an identifier of the device 252. The record generator 212 can generate and store a charge report for the usage reported in the usage message.

The quota manager 208 of the predictive rating buffer 604 can manage the receiving of network grant requests from the device 252 and network and the transmission of the requests to the OCS 204. For example, when the device 252 comes online, the device 252 may send a request to the quota manager 208 for access to a service. Responsive to receiving network grant request, the quota manager 208 can establish a primary allocation balance for each of the services the device 252 can consume. The quota manager 208 can also establish a contingency allocation balance for the device

252. The establishment of the primary allocation balances and one or more contingency allocation balances can be governed by a policy. For example, policy can indicate how much of each service the device 252 is entitle to consume during a given time period (e.g., a month, week, day, or a portion thereof).

The quota manager 208 can also be configured to receive charge reports from the record generator 212. The charge reports can be a data structure that can contain an indication of the type of service consumed, the amount of the service consumed, and a period over which the service was consumed by the device 252.

The quota manager 208 can apply a rating function to the data in the charge report, which converts the amount of services consumed from a unit measurement (e.g., 57 text messages or 13 Mb of data) to a monetary measurement (e.g., $5.70 worth of text messages or $13.00 worth of data). The quota manager 208 can maintain an exchange rate policy that includes the conversion rate between unit measurements and monetary measurements. In some implementations, the exchange rate policy is a per device policy (e.g., each device 252 may have a different exchange rate) and in other implementations the exchange rate policy may be the same for multiple devices 252. Responsive to receiving the charge reports from the record generator 212, the quota manager 208 can update the balances of the usage balance of the device 252.

The quota manager 208 can be configured to report updated balance information for each device 252 to the OCS 204. In some implementations, the quota manager 208 may report the updated balance information periodically based on a schedule outlined in a consumption reporting policy. The consumption reporting policy can specify one or more rules according to which the quota manager 208 reports the update balance information of the device 252 to the OCS 204. For example, the consumption reporting policy can indicate that the quota manager 208 report the balance updates once every predetermined time duration (for example, 4 hours).

In some implementations, once the predictive rating buffer 604 receives the initial grant request form the device 252, the predictive rating buffer 604 can send a request to the OCS 204 for the total active balance and other data about the device 252. Receiving the total active balance of the device 252 can enable the predictive rating buffer 604 to maintain and update the device's balance when new network grant requests arrive from the device 252 without the predictive rating buffer 604 having to send additional messages to the OCS 204. The predictive rating buffer 604 can also include a scheduled activity monitor 704, which can monitor the usage balances of the devices 252 and determine if the usage balances are nearing an expiration time. For example, each of the usage balances may be valid for 6 hours (or any other set length of time), and when the scheduled activity monitor 704 determines the usage balance is about to expire, the predictive rating buffer 604 can request an updated usage balance form the OCS 204.

In some implementations, the primary allocation balances can be maintained in a monetary value. For example, rather than storing a number of available minutes (e.g., 500 minutes) in a usage balance for voice, the local quota and session cache 218 can store a monetary value such as $30.00. The usage units identified as consumed in the charge report from the record generator 212 can be converted into a monetary value by the predictive rating buffer 604. For example, the local quota and session cache 218 can send the predictive rating buffer 604 a message indicating the number of units consumed by the device 252 for a particular service. After receiving the usage message, the predictive rating buffer 604 can convert the units into a monetary value responsive to a policy received from the online charge system 204. The policy can be a lookup table or data structure that indicates a price for a service unit. For example, the lookup table may indicate that each text message unit costs 10 cents, and each kb of data costs 1 cent.

The network router 702 can include an event router 705 and a diameter interface 706. The diameter interface 706 can be an application executing on the network router 702 that converts the incoming messages from the network 104 into the Diameter protocol. The diameter interface 706 can provide an interface between the protocol used in the network 104 and the network used between the network router 702, the predictive rating buffer 604, and the OCS 204.

The OCS 204 of the environment 600 can include a rating function 710, which interfaces with the predictive rating mediator 602 via a rating interface 708. The rating function 710 can perform rating functions similar to that of rating functions performed by the predictive rating buffer 604. That is, the rating function 710 can process charge reports generated by the record generator 212 to determine a monetary cost of the resource usage by the device 252. In some implementations, the rating function 710 can perform more computationally intensive rating functions than can be performed by the predictive rating buffer 604.

Figure 7:
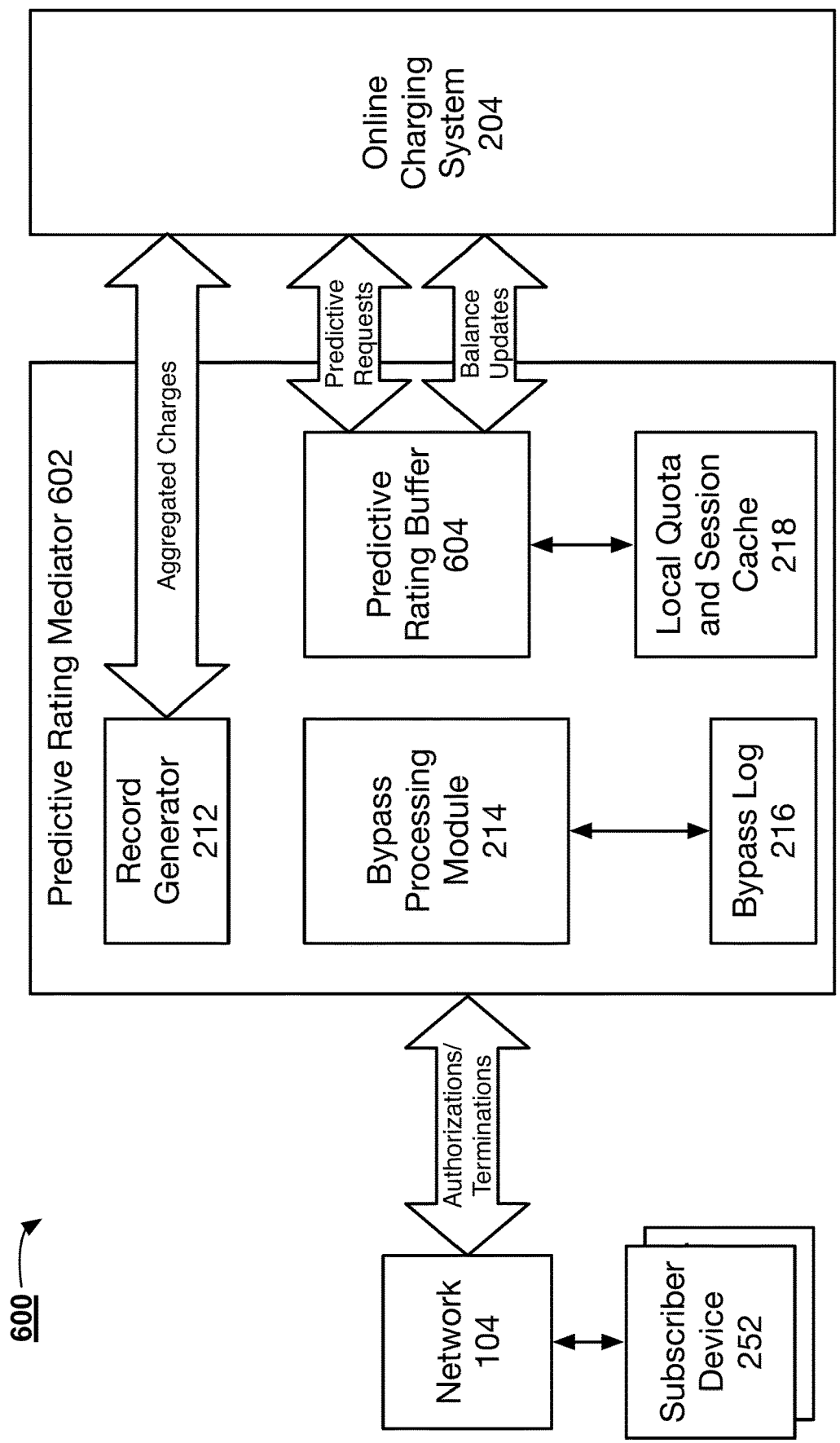
FIG. 7 is a block diagram illustrating additional detail of predictive rating buffer illustrated in FIG. 6.

FIG. 7 is a block diagram illustrating additional detail of the reporting system environment 600. The environment 600 is similar to the above described environment 200 described in relation to FIG. 2. FIG. 7 illustrates various components of the environment 600 that can provide predictive rating buffer 604 bypass functionality. The bypass functionality increases the availability of the predictive rating buffer 604 by enabling the predictive rating buffer 604 to continue to receive authorization requests and terminations from the devices 252 when there is downtime (e.g., a loss of a connection) between the predictive rating mediator 602 and the OCS 204. The environment 600 includes the predictive rating mediator 602, which includes a record generator 212, a bypass processing module 214, a bypass log 216, and a local quota and session cache 218.

In some implementations, bypass functionality enables the predictive rating buffer 604 to continue to operate and monitor device 252 usage without maintaining a connection with the OCS 204, such as during times of network downtime. During the periods of network downtime, the predictive rating buffer 604 can continue to receive authorization requests and terminations from the devices 252. The record generator 212 can continue to generate charge reports, which, as described above, enables device service consumption to be deducted from the device's usage balances. During periods of network downtime, the quota manager 208 of the predictive rating buffer 604 can continue to update the balances as described above. In some implementations, when the predictive rating buffer 604 would send balance updates to the OCS 204 if the network was not in a state of downtime, the predictive rating buffer 604 can store the balance updates in the local quota and session cache 218. When the predictive rating buffer 604 reestablishes a connection with the OCS 204, the predictive rating buffer 604 can retrieve the balance updates from the local quota and session cache 218 and send the balance updates to the OCS 204 to synchronize the data on the predictive rating mediator 602 and the OCS 204.

The predictive rating mediator 602 can also include a bypass processing module 214 and a bypass log 216. In some implementations, the bypass processing module 214 and the bypass log 216 enables the predictive rating mediator 602 to provide a bypass balance to devices 252. The bypass balance may be generated by the bypass processing module 214 when the predictive rating mediator 602 is not in communication with the OCS 204. For example, if the predictive rating mediator 602 receives a network grant request from a device 252 during a period of downtime between the predictive rating mediator 602 and the OCS 204 the bypass processing module 214 can issue a network grant authorization to the predictive rating buffer 604 in place of the OCS 204. In some implementations, the network grant authorization issued by the bypass processing module 214 is made responsive to a bypass policy. The bypass policy may indicate if a device 252 is authorized to be provided a bypass balance or whether the device 252 should be denied service.

Figure 8:
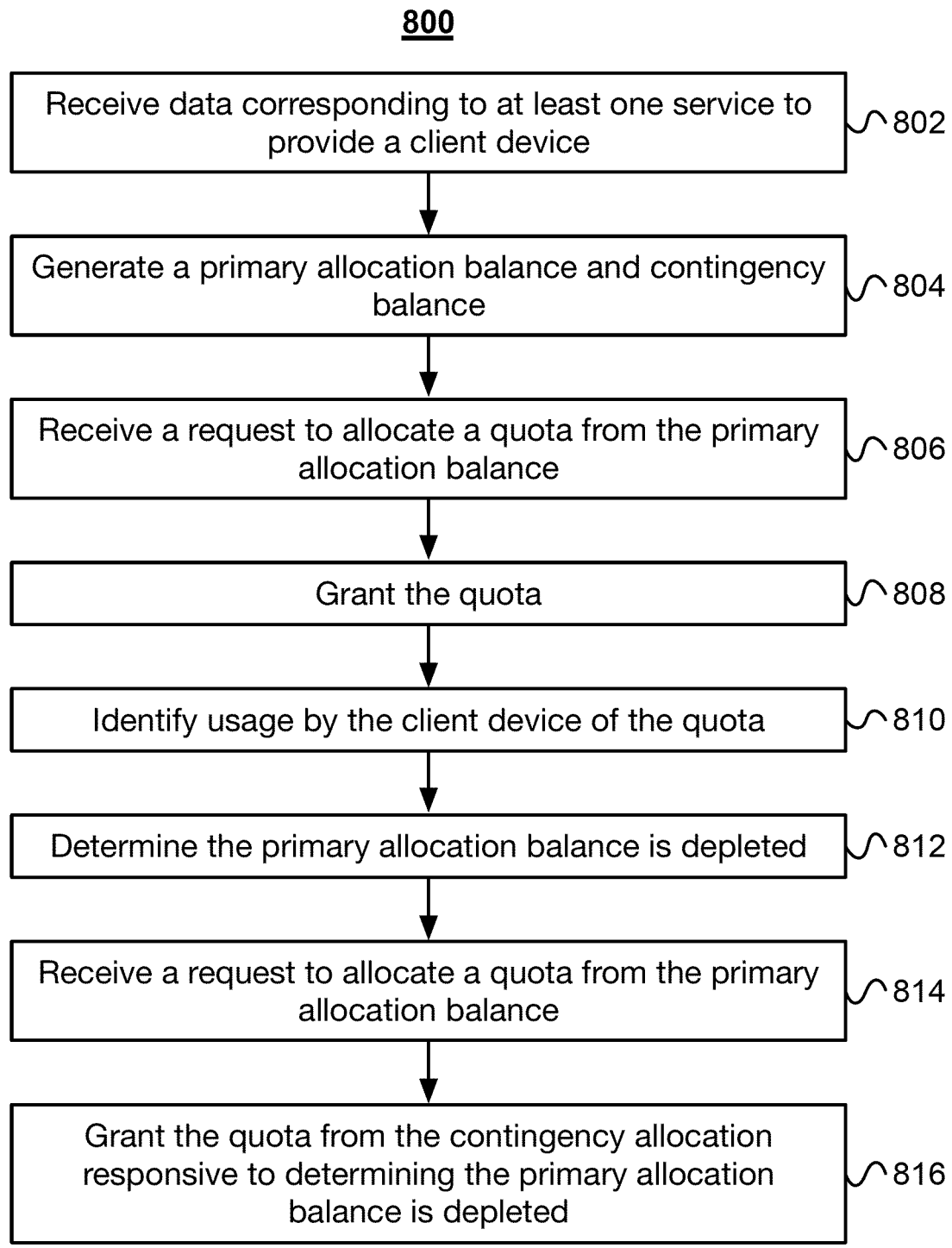
FIG. 8 is a block diagram illustrating an example method for reducing data traffic flow between a network and an online charging solution in the environment illustrated in FIG. 6.

FIG. 8 is a block diagram illustrating an example method 800 for reducing data traffic flow between a network and an online charging solution. The method 800 can include receiving data corresponding to at least one service to provide a client device (BLOCK 802). The method 800 can also include generating a primary allocation balance and a contingency balance (BLOCK 804). The method can also include receiving a request to allocate a grant from the primary allocation balance (BLOCK 806), and granting the grant request (BLOCK 808). The method 800 can also include identifying usage by the client device of the grant (BLOCK 810). The method 800 can also include determining that the primary allocation balance is depleted (BLOCK 812). A request can be received to allocate another grant from the primary allocation balance (BLOCK 814). The additional grant can be granted from the contingency allocation responsive to determining the primary allocation balance is depleted (BLOCK 816).

As set forth above, the example method 800 can include receiving data corresponding to at least one service to provide a client device (BLOCK 802). The data can be received by the predictive rating buffer from the OCS. The data can include which services (e.g., cellular data, voice, and text) the client device is subscribed to. The data can also include plan information for the client device. Plan information can include the amount of each of the services for which the user of the client device has paid or is to receive each month. The data can be received from the OCS at predetermined intervals, such as once a day, week, or month.

The method 800 can include generating a primary allocation balance and a contingency allocation balance (BLOCK 804). A primary allocation balance can be generated for each of the services to which the client device is subscribed. The primary allocation balance can be configured to persist for a predetermined amount of time. For example, the primary allocation balance can include an expiration time that indicates after what duration of time or at what specific time the primary allocation balance expires. The primary allocation balance can indicate a portion of the total network units that are to be assigned to a specific service. For example, the client device may subscribe to 400 minutes per month. One hundred minutes may be allocated to the primary allocation balance, and the primary allocation balance can have an expiration time lasting one week. The predictive rating buffer can also generate a contingency allocation balance. The contingency allocation balance can include additional network units that are used in response to the primary allocation balance being depleted or expiring. The predictive rating buffer can generate one contingency allocation balance to be used in combination with the services of the client device or the predictive rating buffer can generate a different contingency allocation balance for each of the different services.

The method 800 can include receiving a request to allocate a grant from the primary allocation balance (BLOCK 806). The predictive rating buffer can receive the request from the network. The request can be to allocate a grant from the primary allocation balance. The method 800 can also include granting the request (BLOCK 808). The grant can be provided to the network and indicates an amount of network units that the client device can consume. The grant can expire after a predetermined amount of time. For example, the grant may expire after 4 hours.

The method 800 can also include identifying service usage by the client device (BLOCK 810). As the client device consumes services, the predictive rating buffer can monitor the amount of each service that the client device consumes. For example, as the client device makes telephone calls, minutes from grant associate with minutes is consumed. The predictive rating buffer can update the grant to reflect the minutes (or amount of other service) remaining in the grant. The record generator of the predictive rating mediator 602 can receive usage messages or consumption reports from the client device or the network that indicate how much of a service the client device has consumed. The record generator 212 can process the data in the consumption report to generate a charge report for the client device.

The method 800 can also include determining that the primary allocation balance is depleted (BLOCK 812). As the predictive rating buffer receives additional requests, the grants are granted from the primary allocation balance. Each grant depletes the primary allocation balance. For example, if a grant is for 100 text message and the primary allocation balance includes 400 text messages, the primary allocation balance is depleted after the fourth grant. Once the primary allocation balance is depleted a flag can be set that the next grant should be granted by the contingency allocation balance.

The method 800 can also include receiving another request to allocate a grant from the primary allocation balance (BLOCK 814), and then granting the grant from the contingency allocation balance (BLOCK 816). Responsive to predictive rating buffer determining the primary allocation balance is depleted, the predictive rating buffer can grant the request from the contingency allocation balance.

In some implementations, when the primary allocation balance is exhausted, the predictive rating buffer grants requests from a second primary allocation balance. For example, the primary allocation balance may expire after a set period of time, such as 1 month. The predictive rating buffer may generate a second primary allocation balance to use after the expiration of the first primary allocation balance. Once the predictive rating buffer determines that the first primary allocation balance has expired (or is otherwise exhausted), the predictive rating buffer can begin to grant requests from the second primary allocation balance.

Figure 9:
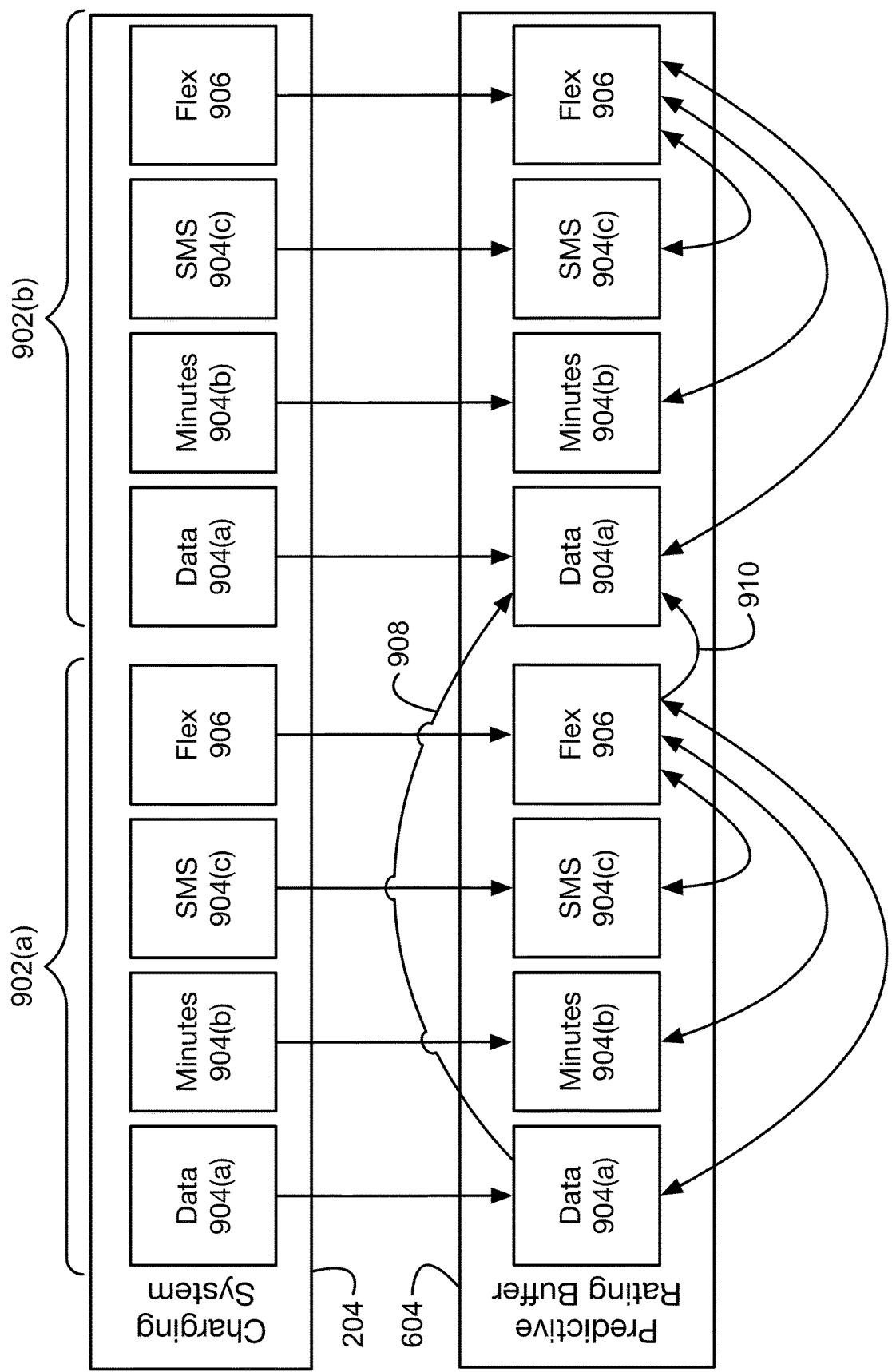
FIG. 9 illustrates a block diagram of the provisioning of network usage balances to the predictive rating buffer.

FIG. 9 illustrates a block diagram of the predictive rating buffer 604 generating a first and a second primary allocation balance. As described above in relation to BLOCK 802, the predictive rating buffer 604 can receive data 904(a)-904(d) about the services provided to a client device. Responsive to the data 904, the predictive rating buffer 604, generates primary allocation balances. As illustrated in FIG. 9, the predictive rating buffer 604 generates a first set of primary allocation balances 902(a) and a second set of primary allocation balances 902(b) for the services. The predictive rating buffer 604 also generates a first and second contingency allocation balance 906. The first and second contingency allocation balance are associated with the first and second primary allocation balance, respectively. In this example, the user may prepay for a monthly service plan that includes 4 GB of data, 1000 minutes of talk time, and 1000 SMS messages. The predictive rating buffer 604 can divide the total available balance into multiple sets of primary allocation balances based on time (e.g., one portion per week) or service consumption (e.g., each portion is ¼$^{th}$ the total balance). As illustrated, each of the primary allocation balances 902 is associated with a different service—for example, a data service, a voice (or minute) service, and a SMS service.

As the client device consumes services, the predictive rating buffer 604 can monitor the amount of each service that the client device consumes. For example, to make telephone calls, the predictive rating buffer 604 allocates grants from the primary allocation balance 904(*b*). The consumption of services by the client device from the grant may be monitored and identified by the record generator. The record generator of the predictive rating mediator 602 can receive usage messages from the client device. The record generator can process the data in the usage messages to generate a charge report for the client device.

As the client device consumes the services, the respective balances of each of the primary allocation balance can eventually be exhausted if the device consumes the amount of service for which was paid. In some implementations, the device's account can include a contingency balance 906 that stores an extra balance, which may be drawn upon when a primary allocation balance is exhausted. The amount of contingency allocation balance used by each of the different services can be based on an exchange rate. For example, the balance for each of the primary allocation balances may be maintained in a unit that corresponds to the service—the data usage balance can be maintained in Gb, the voice usage balance can be maintained in remaining minutes, and the SMS usage balance can be maintained in remaining text messages. The contingency balance can be maintained in a monetary unit (e.g., dollars). When a primary allocation balance is exhausted and the contingency allocation balance is used, a grant from the contingency allocation balance to the service may be provided as a set monetary value (e.g., $5), which can be converted to the appropriate service unit with the exchange rate. For example, if the contingency balance provides a $5 grant to the client device, the $5 can be converted to 0.5 Gb of data if the exchange rate was such that 0.1 Gb of data costs $1. In some implementations, the monetary value of the grant may vary depending on the type of service. For example, a $10 grant may be supplied as a data grant because of the relative expense of data use while a $2 grant for SMS usage may be supplied to the device.

In other implementations, the predictive rating buffer 604 can determine if the device over-exhausts a primary allocation balance—for example, the client device used 114 text messages when the primary allocation balance only provided for 100 text message. The predictive rating buffer 604 can calculate the number of network units consumed after the exhaustion (e.g., 14 text messages in the previous example) and, using the exchange rate, deduct the proper monetary value from the contingency allocation balance.

As illustrated in FIG. 9, when one of the primary allocation balances 904 is exhausted, the next requested grant to the exhausted primary allocation balance is fulfilled by the contingency allocation balance 906. As the predictive rating buffer 604 continues to identify service usage by the client device after the primary allocation balance is exhausted, the predictive rating buffer 604 can continue to allocate grants from the contingency allocation balance.

In some implementations, once an exhaustion of a primary allocation balance (or set thereof) occurs, the predictive rating buffer 604 can allocate grants from a second primary allocation balance (or set thereof). In some implementations, the second primary allocation balance can be generated by the predictive rating buffer 604 prior to the exhaustion of the first primary allocation balance. The predictive rating buffer 604 may determine a start and an end time for the first primary allocation balance, and once the primary allocation balance expires, grant requests can be fulfilled from the second primary allocation balance. FIG. 9 also illustrates a second set of primary allocation balances 902(*b*). The predictive rating buffer 604 can grant requests from the primary allocation balances 904 of the second primary allocation balance set 902(*b*) once the first primary allocation balance set 902(*a*) expires (as indicated by line 908) or when individual primary allocation balances 904 or the contingency allocation balance 906 are exhausted (as indicated by line 910).

Figure 10:
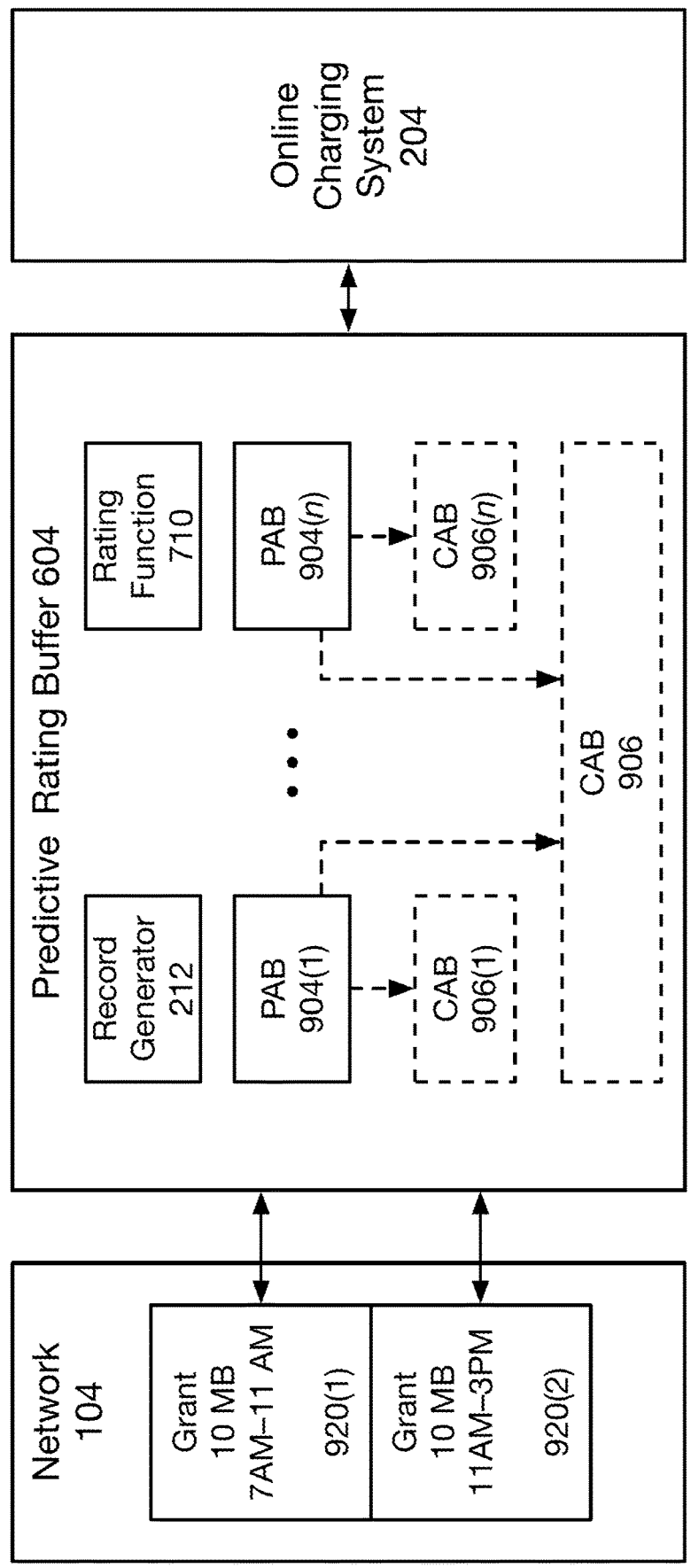
FIG. 10 illustrates a block diagram of an example reporting system environment.

FIG. 10 is a block diagram illustrating an example of a reporting system environment 600. The environment 600 includes a predictive rating buffer 604 in communication with an OCS 204 and a network 104. The predictive rating buffer 604 can generate primary allocation balances 904(1)-904(*n*). Each of the primary allocation balances 904 can correspond to one of the services to which a client device subscribes. In one option, a contingency allocation balance 906(1)-906(*n*) is generated for each of the primary allocation balances 904(1)-904(*n*). In another option, a single contingency allocation balance 906 is generated. The single contingency allocation balance 906 is configured to grant requests from any of the primary allocation balances 904 when the primary allocation balance 904 is depleted. FIG. 10 illustrates the predictive rating buffer 604 allocating a first grant 920(1) and a second grant 920(2) to the network 104. The first grant 920(1) is a 10 MB grant that persists from 7 AM to 11 AM. At 11 AM the first grant 920(1) expires and a second grant 920(2) is granted to the network 104. While only two grants for the data service are illustrated, grants can be allocated for each subscribed services can be allocated. Additionally, prior and subsequent grants can be provided to the network such that a grant is available to the network during any time of the day. Each of the grants 920 can provide consumption reports back to the predictive rating buffer 604 such that the predictive rating buffer 604 can determine how much of a service the client device consumed.

D. Conclusion

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed is:

1. A method for reducing data traffic flow between a network and an online charging solution, comprising:
   receiving, by a predictive rating buffer, from an online charging solution, for a client device, data corresponding to at least one service to provide to the client device, the data received prior to receiving a request for a rating from the client device;
   generating, by the predictive rating buffer, for a first service of the at least one service to which the client device is subscribed, a primary allocation balance and a contingency allocation balance, the primary allocation balance for the first service having an expiration time, the contingency allocation balance to be used responsive to depletion of the primary allocation balance for the first service;
   receiving, by the predictive rating buffer, a first request to allocate a first grant from the primary allocation balance for the first service to be used by the client device;
   granting, by the predictive rating buffer, from the primary allocation balance for the first service, the first grant responsive to the first request;
   identifying, by the predictive rating buffer, usage by the client device from the first grant of the first service;
   updating, by the predictive rating buffer, the primary allocation balance for the first service responsive to the identified usage by the client device;
   determining, by the predictive rating buffer, that the primary allocation balance for the first service is depleted;
   receiving, by the predictive rating buffer, a second request to allocate a second grant from the primary allocation balance for the first service to be used by the client device; and
   granting, by the predictive rating buffer, from the contingency allocation balance responsive to determining that the primary allocation balance for the first service has been depleted, the second grant responsive to the second request.

2. The method of claim 1, further comprising:
   identifying, by the predictive rating buffer, additional usage by the client device from the second grant for the first service; and
   updating, by the predictive rating buffer, the contingency allocation balance responsive to identifying the additional usage by the client device of the second grant.

3. The method of claim 1, further comprising generating, responsive to an exhaustion of the primary allocation balance, a second primary allocation balance for the first service to which the client device is subscribed.

4. The method of claim 1, further comprising:
   generating, prior to an exhaustion of the primary allocation balance, a second primary allocation balance for the first service to which the client device is subscribed.

5. The method of claim 4, further comprising:
   receiving, by the predictive rating buffer, a third request to allocate a third grant from the second primary allocation of the first service to be used by the client device;
   granting, by the prediction rating buffer, from the second primary allocation balance, the third grant responsive to the third request;

identifying, by the prediction rating buffer, additional usage by the client device from the third grant for the first service; and updating, by the prediction rating buffer, the second primary allocation for the first service responsive to the identified additional usage by the client device.

6. The method of claim 1, further comprising generating, by the prediction rating buffer, a primary usage balance for a second service of the at least one services to which the client device is subscribed.

7. The method of claim 6, further comprising receiving, by the predictive rating buffer, a third request to allocate a third grant from the primary allocation balance for the second service to be used by the client device.

8. The method of claim 1, wherein the first service includes one of a data service, a short message service (SMS), and a voice service.

9. The method of claim 1, further comprising granting from the contingency allocation balance the second grant responsive to an exchange rate.

10. The method of claim 1, further comprising:
generating, by the predictive rating buffer, one or more charge reports responsive to the identified usage by the client device; and
transmitting, by the predictive rating buffer, an aggregated charge report to the online charging solution, the aggregated charge report generated from the one or more charge reports responsive to a charge reporting policy.

11. A system for reducing data traffic flow between a network and an online charging solution, comprising:
a predictive rating buffer including one or more processors, configured to:
receive from an online charging solution, for a client device, data corresponding to at least one service to provide to the client device, the data received prior to receiving a request for a rating from the client device;
generate for a first service of the at least one service to which the client device is subscribed, a primary allocation balance and a contingency allocation balance, the primary allocation balance for the first service having an expiration time, the contingency allocation balance to be used responsive to depletion of the primary allocation balance for the first service;
receive a first request to allocate a first grant from the primary allocation balance for the first service to be used by the client device;
grant from the primary allocation balance for the first service, the first grant responsive to the first request;
identify usage by the client device from the first grant for the first service;
update the primary allocation balance for the first service responsive to identifying the usage by the client device;
determine that the primary allocation balance for the first service has been depleted;
receive a second request to allocate a second grant from the primary allocation balance for the first service to be used by the client device; and
grant from the contingency allocation balance responsive to determining that the primary allocation balance for the first service has been depleted, the second grant responsive to the second request.

12. The system of claim 11, wherein the predictive rating buffer is further configured to:
identify additional usage by the client device from the second grant for the first service; and
update the contingency allocation balance responsive to identifying the additional usage by the client device of the second grant.

13. The system of claim 11, wherein the predictive rating buffer is further configured to generate, responsive to an exhaustion of the primary allocation balance, a second primary allocation balance for the first service to which the client device is subscribed.

14. The system of claim 11, wherein the predictive rating buffer is further configured to generate, prior to an exhaustion of the primary allocation balance, a second primary allocation balance for the first service to which the client device is subscribed.

15. The system of claim 14, wherein the predictive rating buffer is further configured to:
receive a third request to allocate a third grant from the second primary allocation of the first service to be used by the client device;
grant from the second primary allocation balance, the third grant responsive to the third request;
identify additional usage by the client device from the third grant for the first service; and
update the second primary allocation for the first service responsive to the identified additional usage by the client device.

16. The system of claim 11, wherein the predictive rating buffer is further configured to generate a primary usage balance for a second service of the at least one services to which the client device is subscribed.

17. The system of claim 14, wherein the predictive rating buffer is further configured receive a third request to allocate a third grant from the primary allocation balance for the second service to be used by the client device.

18. The system of claim 11, wherein the first service includes one of a data service, a short message service (SMS), and a voice service.

19. The system of claim 11, wherein the predictive rating buffer is further configured to grant from the contingency allocation balance the second grant responsive to an exchange rate.

20. The system of claim 11, wherein the predictive rating buffer is further configured to:
generate one or more charge reports responsive to the identified usage by the client device; and
transmit an aggregated charge report to the online charging solution, the aggregated charge report generated from the one or more charge reports responsive to a charge reporting policy.

* * * * *